United States Patent
Watanabe et al.

[19]

[11] Patent Number: 6,151,284
[45] Date of Patent: Nov. 21, 2000

[54] DISK DEVICE HAVING A FLEXIBLE PRINTED CIRCUIT CABLE PROVIDING A SMALL-HEIGHT STRUCTURE

[75] Inventors: Takashi Watanabe, Ichikawa; Nobuhiko Fujimura, Hachioji; Yo Kamei, Kokubunji, all of Japan

[73] Assignee: TEAC Corporation, Tokyo, Japan

[21] Appl. No.: 08/928,962

[22] Filed: Sep. 12, 1997

Related U.S. Application Data

[63] Continuation of application No. 08/629,521, Apr. 9, 1996, abandoned.

[30] Foreign Application Priority Data

Jul. 26, 1995 [JP] Japan .................................... 7-190736
Jul. 28, 1995 [JP] Japan .................................... 7-193492

[51] Int. Cl.⁷ .................................................. G11B 33/02
[52] U.S. Cl. .......................................................... 369/75.2
[58] Field of Search ................................ 369/75.1, 75.2, 369/77.1, 77.2

[56] References Cited

U.S. PATENT DOCUMENTS 4,965,684 10/1990 Stefansky ............................... 369/75.1
5,301,178 4/1994 Okabe et al. ........................... 369/77.1

FOREIGN PATENT DOCUMENTS 7-254264 10/1995 Japan .
184030 11/1992 Taiwan .
246991 1/1995 Taiwan .

OTHER PUBLICATIONS

First Office Action—Taiwanese Patent Office—Jan. 22, 1997 w/ English Trans.

*Primary Examiner*—David Davis
*Attorney, Agent, or Firm*—Michael N. Meller; Eugene Lieberstein

[57] ABSTRACT

A disk device includes a chassis having a printed circuit board provided therein. A moving unit on which a recording disk is held has a sub-chassis and electrical parts on the sub-chassis, the moving unit being movably supported on the chassis so that the moving unit is movable between an inserted position and a disk-change position in an insert direction and an eject direction. A first connector is arranged on the sub-chassis of the moving unit, the first connector being electrically coupled to the electrical parts of the moving unit. A flexible printed circuit cable has a first connector portion fitted to the first connector so that the electrical parts of the moving unit are electrically connected to the printed circuit board of the chassis, the first connector portion being arranged under the sub-chassis of the moving unit.

20 Claims, 23 Drawing Sheets

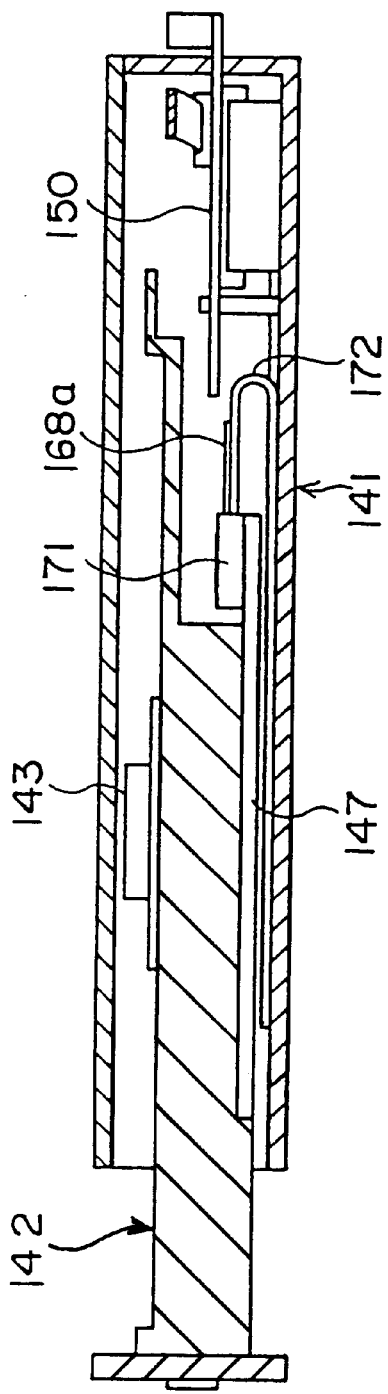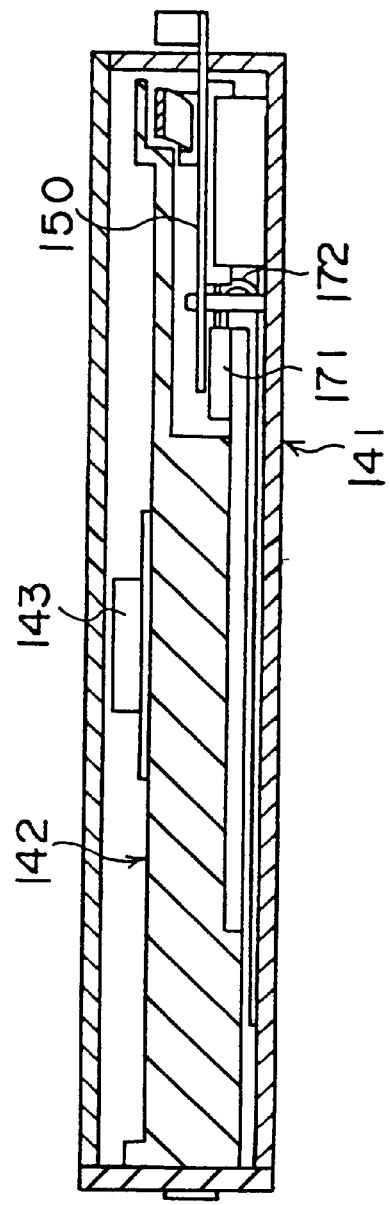
FIG. 10A
FIG. 10B

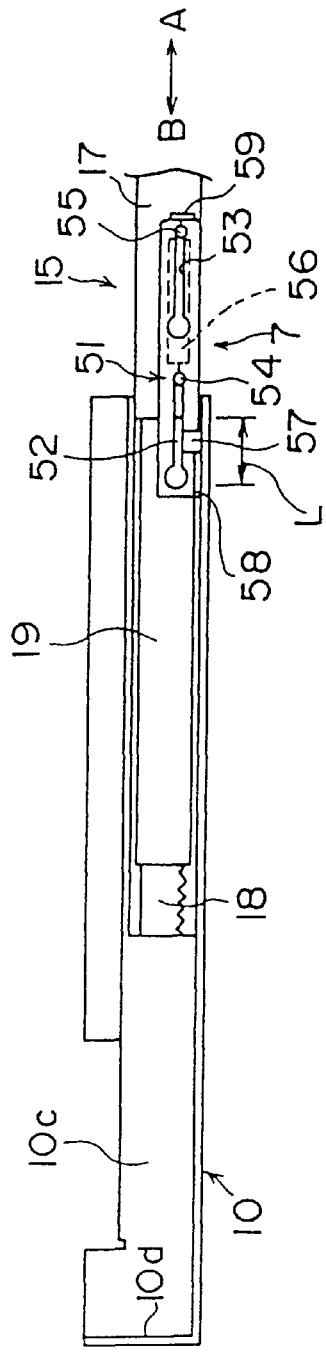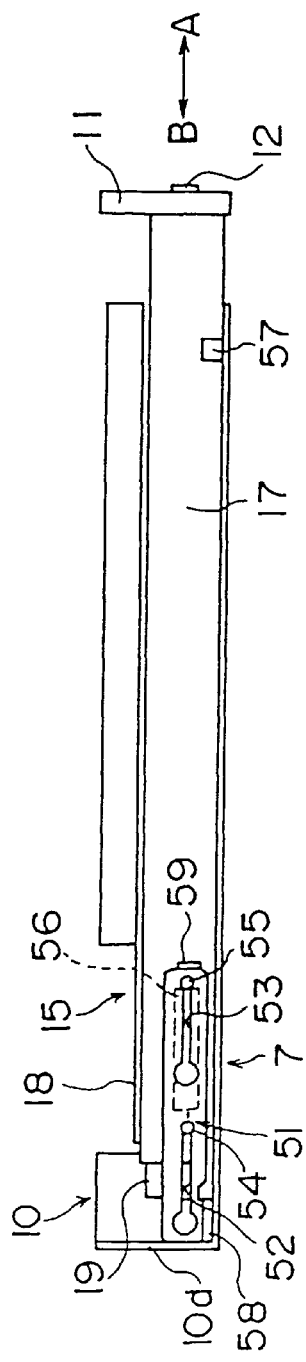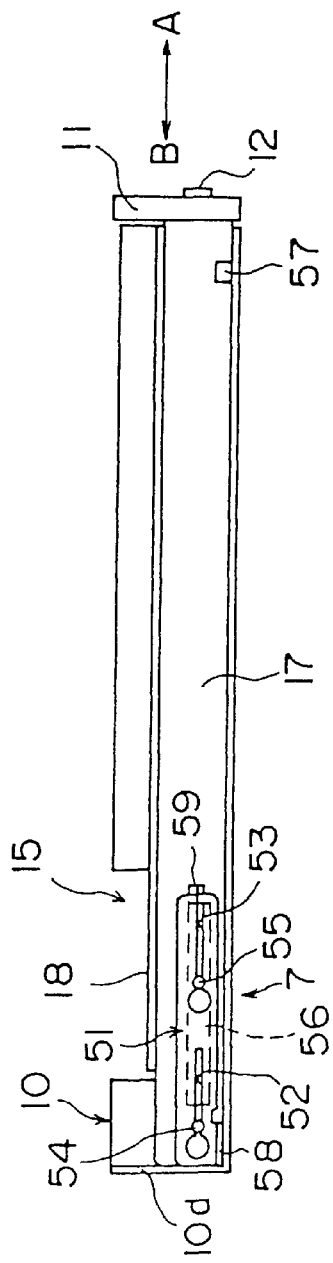

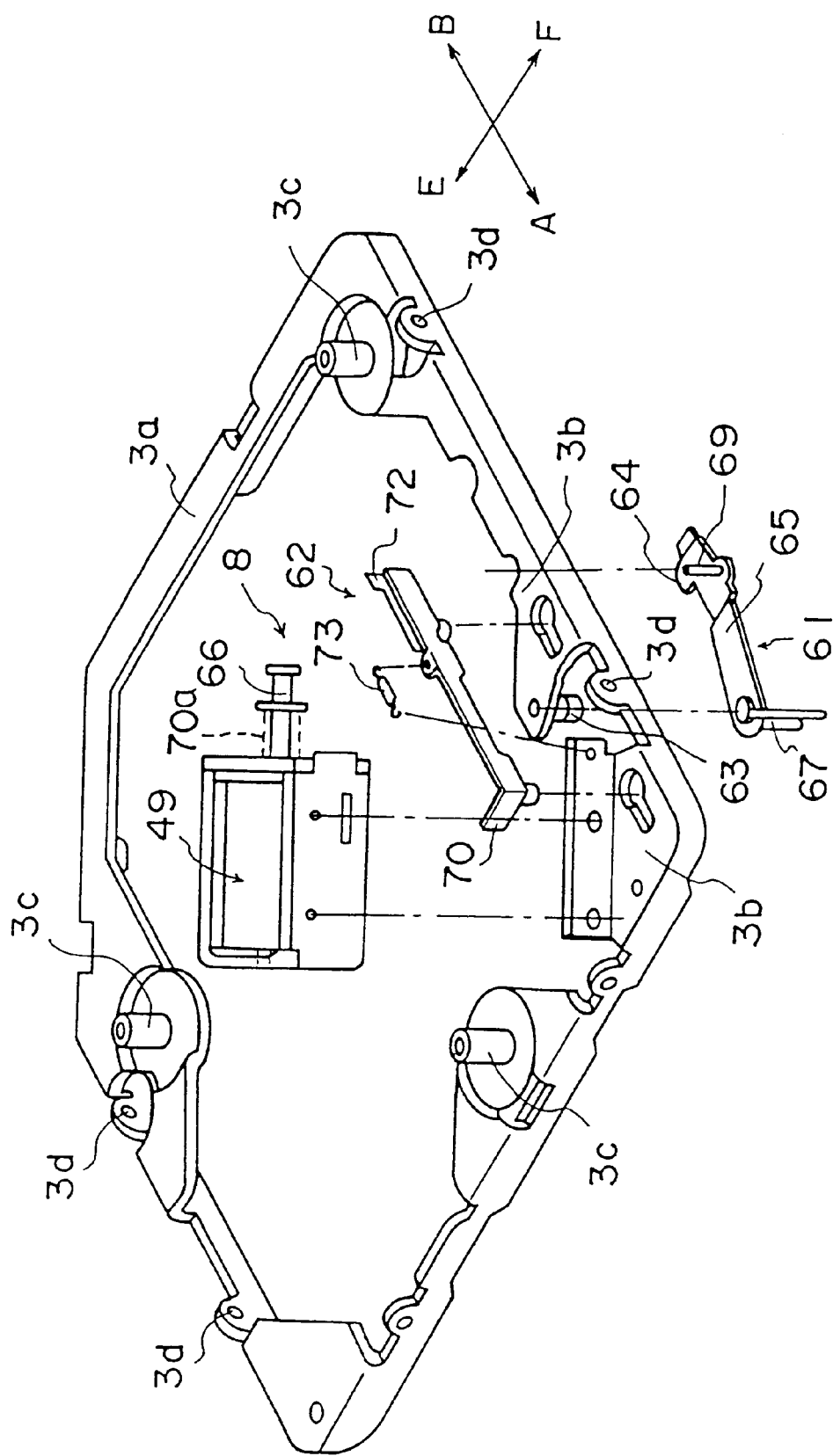

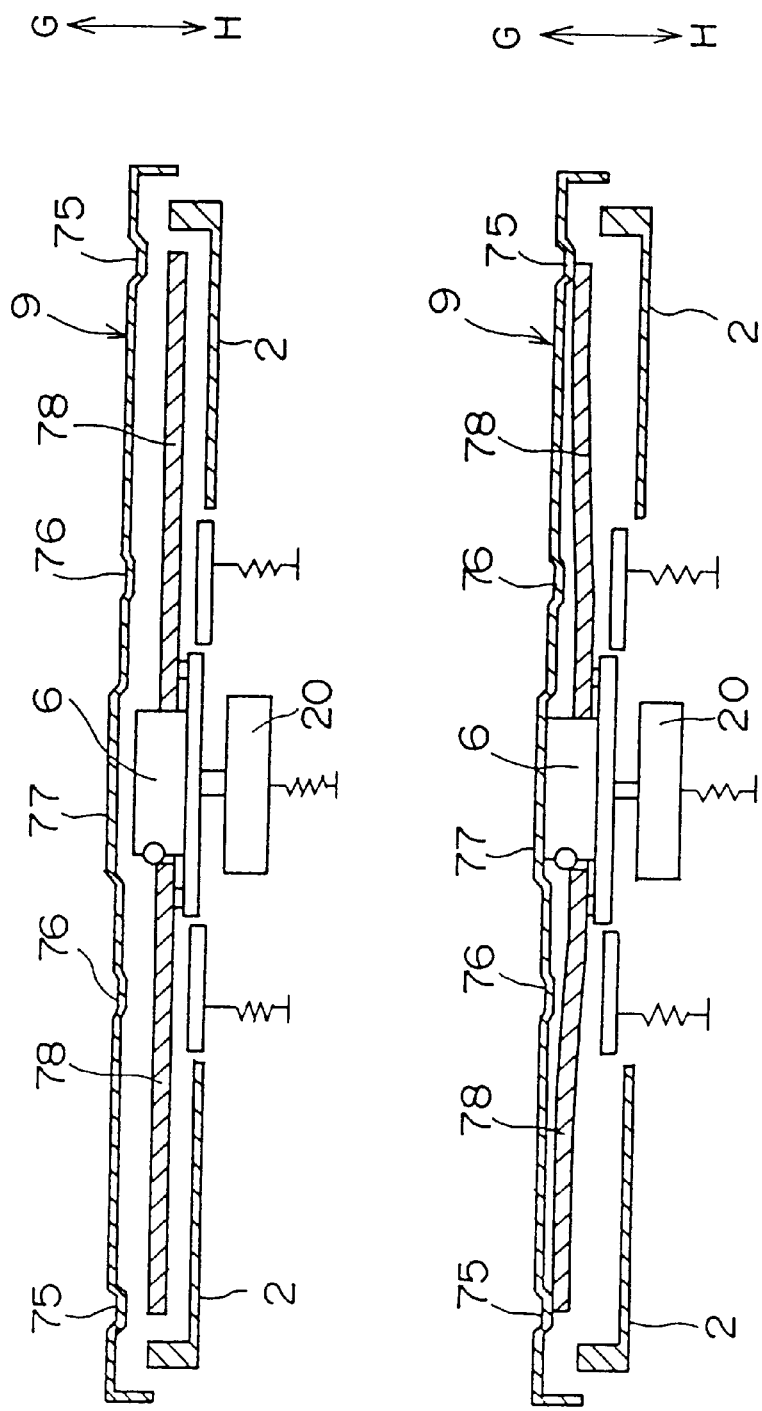

DISK DEVICE HAVING A FLEXIBLE PRINTED CIRCUIT CABLE PROVIDING A SMALL-HEIGHT STRUCTURE

This application is a continuation of application Ser. No. 08/629,521, filed Apr. 9, 1996, abandoned.

BACKGROUND OF THE INVENTION

(1) Field of the Invention

The present invention generally relates to a disk device, and more particularly to a CD-ROM disk device, built in a casing of a small-size personal computer, wherein a moving unit on which a CD-ROM is held is movable between an inserted position and a disk-change position in both an insert direction and an eject direction.

(2) Description of the Related Art

FIG. 1 shows a conventional CD-ROM disk device 100. The conventional CD-ROM disk device of this kind is disclosed in, for example, Japanese Patent Application No.6-45582 which is assigned to the assignee of the present invention. The CD-ROM disk device 100 shown in FIG. 1 is a built-in type that is installed in a casing of a notebook-size personal computer for use and operation. A CD-ROM (compact disk-read-only memory) is a type of optical disk which is capable of storing large amounts of information. The CD-ROM is accessed by an optical pickup of the CD-ROM disk device in order to reproduce information on the CD-ROM.

Referring to FIG. 1, the conventional CD-ROM disk device 100 generally has a chassis 111 and a moving unit 112. An optical disk (not shown) is held on the moving unit 112. The moving unit 112 is movably supported on the chassis 111 via guide rails, so that the moving unit 112 is movable in forward and rearward directions (indicated by arrows A and B in FIG. 1) between an inserted position and a disk-change position. The movements of the moving unit 112 in the eject direction A and the insert direction B are actuated by a manual operation of an operator on the personal computer.

The moving unit 112 is inserted into the chassis 111 in the insert direction B and placed at the inserted position for the operation of the disk device 100. When the optical disk on the moving unit 112 is to be removed or changed, the moving unit 112 is pulled out from the chassis 111 and moved in the eject direction A to the disk-change position, as shown in FIG. 1.

The chassis 111 has a main printed circuit board provided at a rear base portion of the chassis 111. The moving unit 112 has electrical parts, such as a disk motor, an optical pickup and other mechanical elements provided thereon. A flexible printed circuit cable 120, which is shown in FIG. 2, is arranged around a right side of the chassis 111 to electrically connect the electrical parts of the moving unit 112 to the main printed circuit board of the chassis 111. Hereinafter, the flexible printed circuit cable 120 will be referred to as the FPC cable 120.

It is necessary that the FPC cable 120 include a number of wires (e.g., 43 wires) required for the electrical connections between the electrical parts of the moving unit 112 and the main printed circuit board of the chassis 111. Since the moving unit 112 is movably supported on the chassis 111, the FPC cable 120 has a curved portion 120h which is flexibly deformable when the moving unit 112 is moved relative to the chassis 111 in the eject direction A or the insert direction B. In the conventional disk device 100, the FPC cable 120 has a multiple-layer structure wherein each layer of the FPC cable has a limited number of wires provided for the required electrical connections. Three end portions 120d, 120e and 120f of the FPC cable 120, as shown in FIG. 2, are electrically connected to the electrical parts of the moving unit 112, and three end portions 120a, 120b and 120c of the FPC cable 120 at the opposite end are electrically connected to the main printed circuit board of the chassis 111.

Accordingly, there is a problem that the manufacturing cost of the conventional CD-ROM disk device 100 becomes high because the FPC cable 120 having the multiple-layer structure is expensive.

In addition, a CD-ROM disk device having a small size and small height that can be easily built in a casing of a small-size personal computer is demanded in the field. Therefore, it is desirable to design a CD-ROM disk device having a smaller height.

As shown in FIG. 2, the FPC cable 120 includes a vertical folded portion 120g adjacent to the end portions 120d, 120e and 120f, and a horizontal extending portion 120i adjacent to the end portions 120a, 120b and 120c. The chassis 111 has a lowered hollow portion on the right side of the chassis 111 as shown in FIG. 1. Since the disk device 100 must have a limited amount of size, it is necessary that the horizontal extending portion 120i of the FPC cable 120 is arranged at the right side of the chassis 111 above the lowered hollow portion thereof. Since the disk device 100 must have a limited amount of height, it is necessary to make the width "W1" of the vertical folded portion 120g of the FPC cable 120 smaller than the limited amount of height of the disk device 100. For this reason, it is difficult to avoid the multiple-layer structure of the FPC cable 120 in the case of the conventional CD-ROM disk device 100.

Further, the conventional CD-ROM disk device 100 is required to arrange the FPC cable 120 having the vertical folded portion 120g and the horizontal extending portion 120i within a limited space of the chassis 111. It is difficult to design a CD-ROM disk device having a small size and small height in the case of the conventional CD-ROM disk device 100.

SUMMARY OF THE INVENTION

An object of the present invention is to provide an improved disk device in which the above-described problems are eliminated.

Another object of the present invention is to provide a disk device which includes a flexible printed circuit cable having a simple structure that provides a small height for the disk device.

Still another object of the present invention is to provide a disk device which includes a flexible printed circuit cable which is less expensive and provides a reduction of the manufacturing cost.

The above-mentioned objects of the present invention are achieved by a disk device which includes: a chassis having a printed circuit board provided therein; a moving unit on which a recording disk is held, the moving unit having a sub-chassis and electrical parts on the sub-chassis, the moving unit being movably supported on the chassis so that the moving unit is movable between an inserted position and a disk-change position in an insert direction and an eject direction; a first connector arranged on the sub-chassis of the moving unit, the first connector being electrically coupled to the electrical parts of the moving unit; and a flexible printed circuit cable having a first connector portion fitted to the first connector so that the electrical parts of the moving unit are electrically connected to the printed circuit board of the chassis, the first connector portion being arranged under the sub-chassis of the moving unit.

It is possible that the disk device of the present invention provides a small height for the disk device since the flexible printed circuit cable has a flat, single-layer structure to electrically connects the electrical parts of the moving unit to the printed circuit board of the chassis. Further, it is possible that the disk device of the present invention provides a reduced manufacturing cost since the flexible printed circuit cable having a flat, single-layer structure is less expensive than the multiple-layer structure cable of the conventional disk device.

BRIEF DESCRIPTION OF THE DRAWINGS

Other objects, features and advantages of the present invention will be more apparent from the following detailed description when read in conjunction with the accompanying drawings in which:

FIGS. 10A and 10B are diagrams showing conditions of the flexible printed circuit cable when the moving unit is moved between the inserted position and the disk-change position;

FIGS. 20A, 20B and 20C are diagrams for explaining the functions of the tray pushing unit;

FIG. 21 is an exploded perspective view of a sub-chassis and a tray locking unit of the CD-ROM disk device;

FIGS. 26A and 26B are cross-sectional views of the cover plate for explaining the function of the cover plate.

DETAILED DESCRIPTION OF THE PREFERRED EMBODIMENTS

A description will now be given of the preferred embodiments of the present invention with reference to the accompanying drawings.

Figure 3:
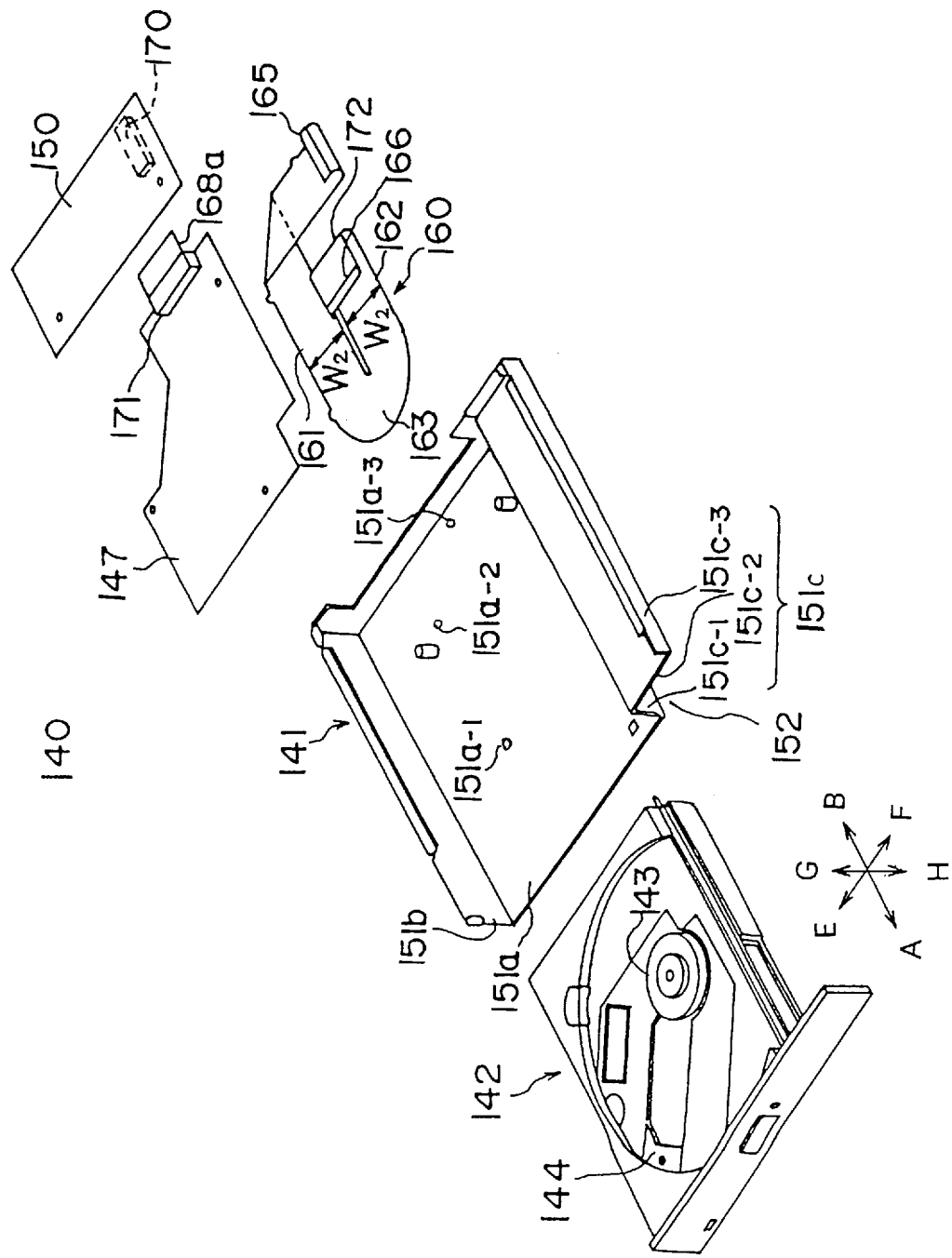
FIG. 3 is an exploded perspective view of a CD-ROM disk device to which one embodiment of the present invention is applied.

FIG. 3 shows a CD-ROM disk device 140 to which one embodiment of the present invention is applied. The disk device 140 generally has a chassis 141 and a moving unit 142.

Figure 4:
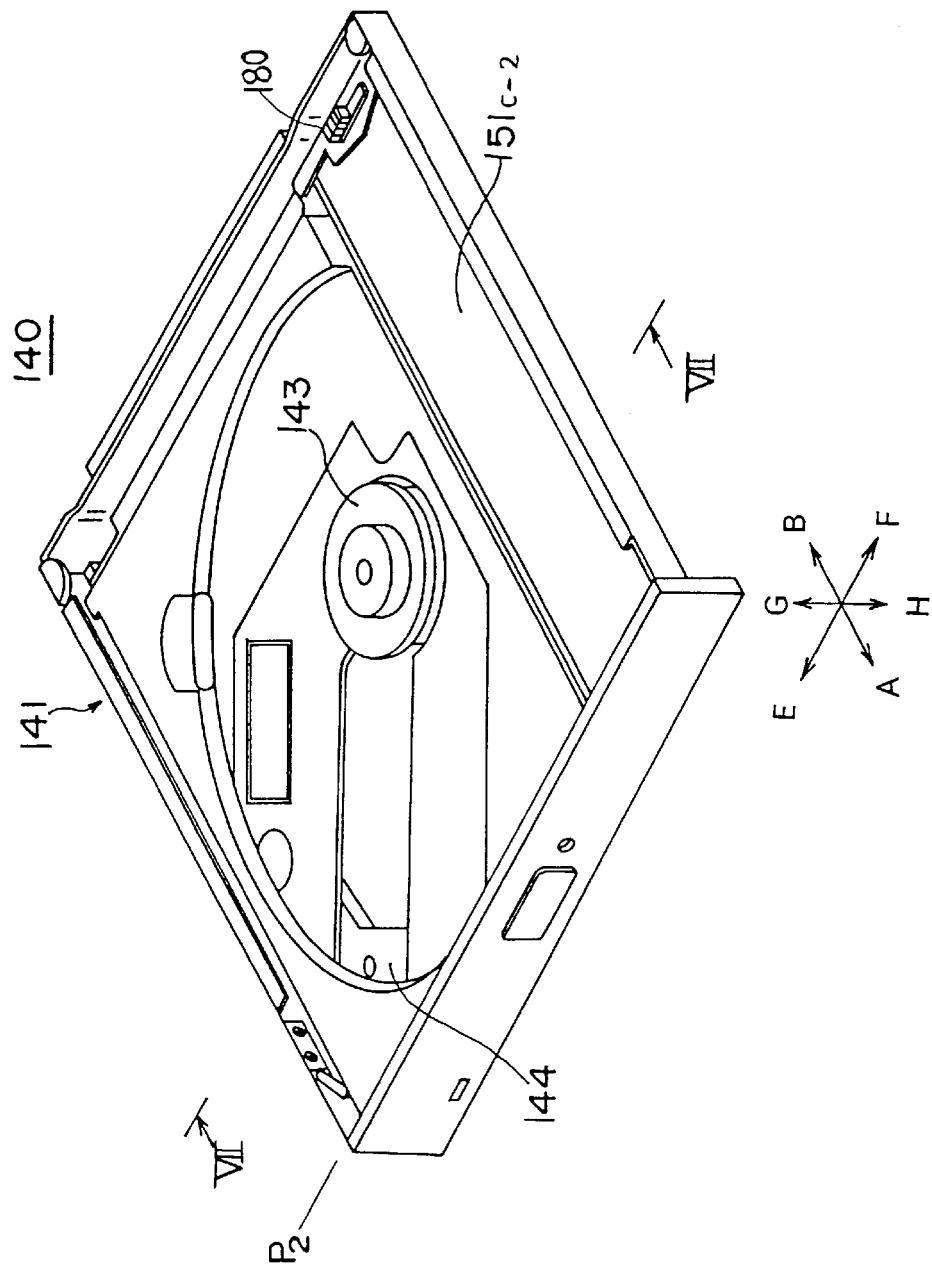
FIG. 4 is a perspective view of the CD-ROM disk device when a moving unit is placed at an inserted position.
Figure 5:
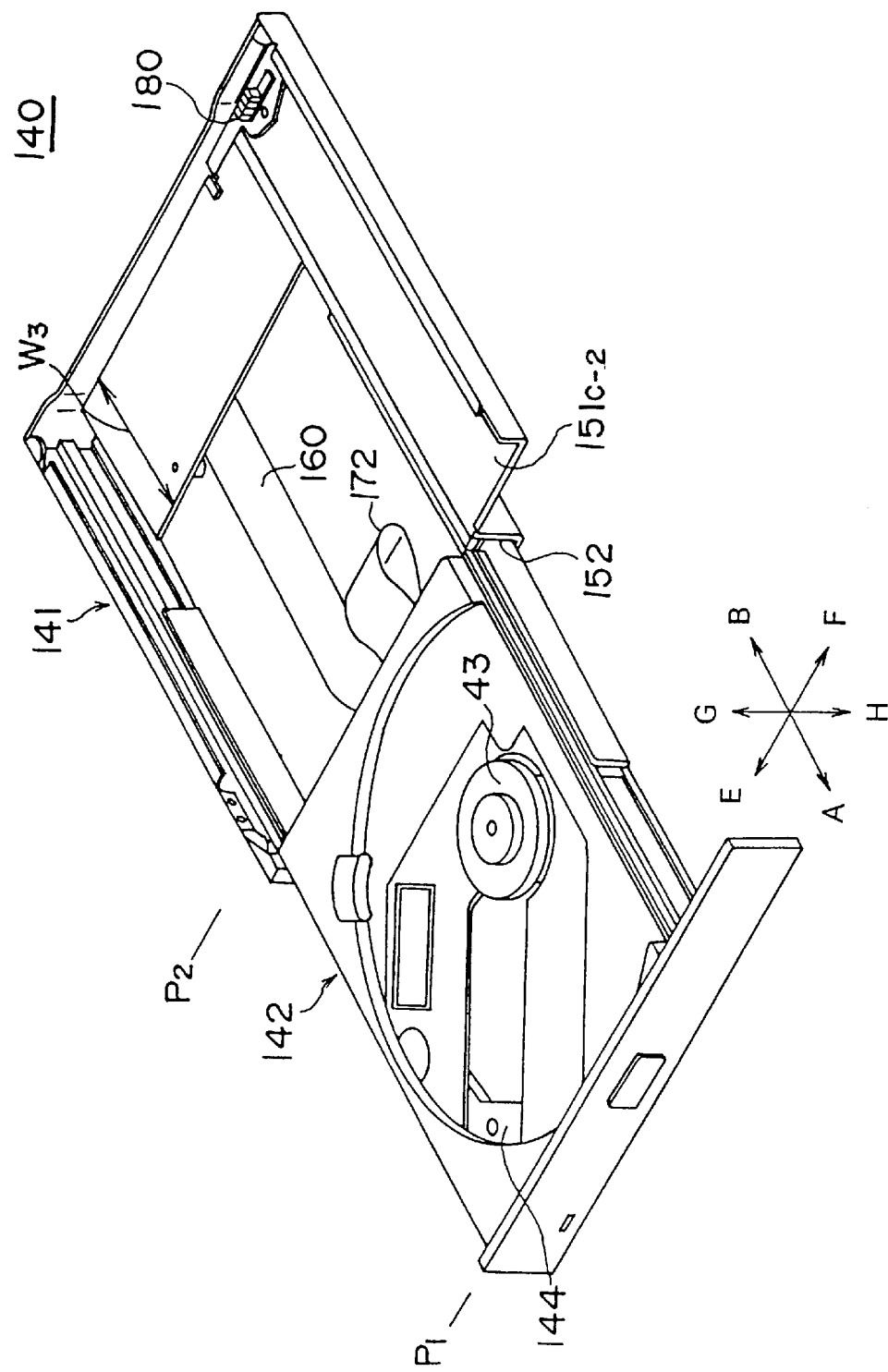
FIG. 5 is a perspective view of the CD-ROM disk device when the moving unit is moved to a disk-change position.
Figure 6:
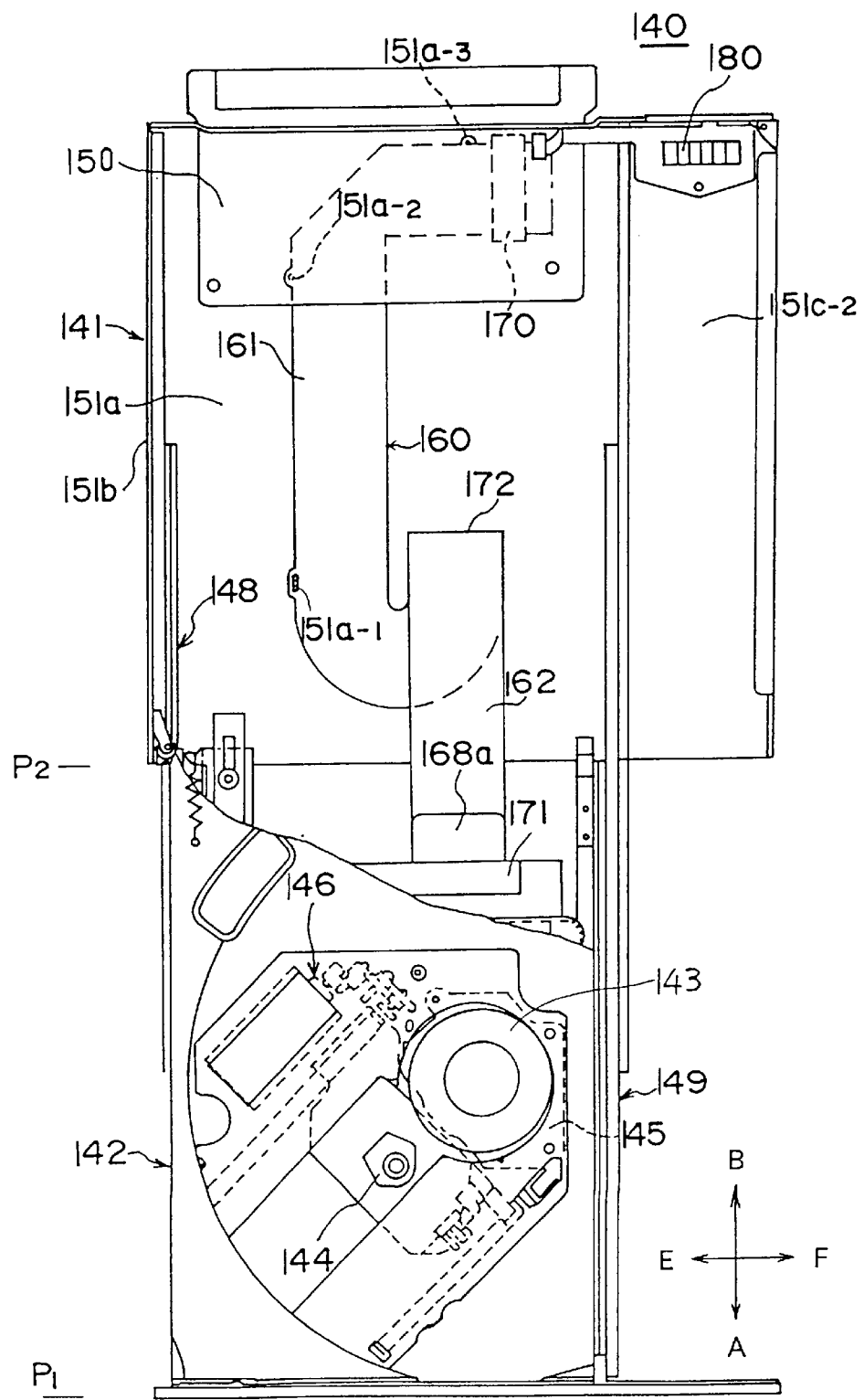
FIG. 6 is a top view of the CD-ROM disk device shown in FIG. 5.
Figure 7:
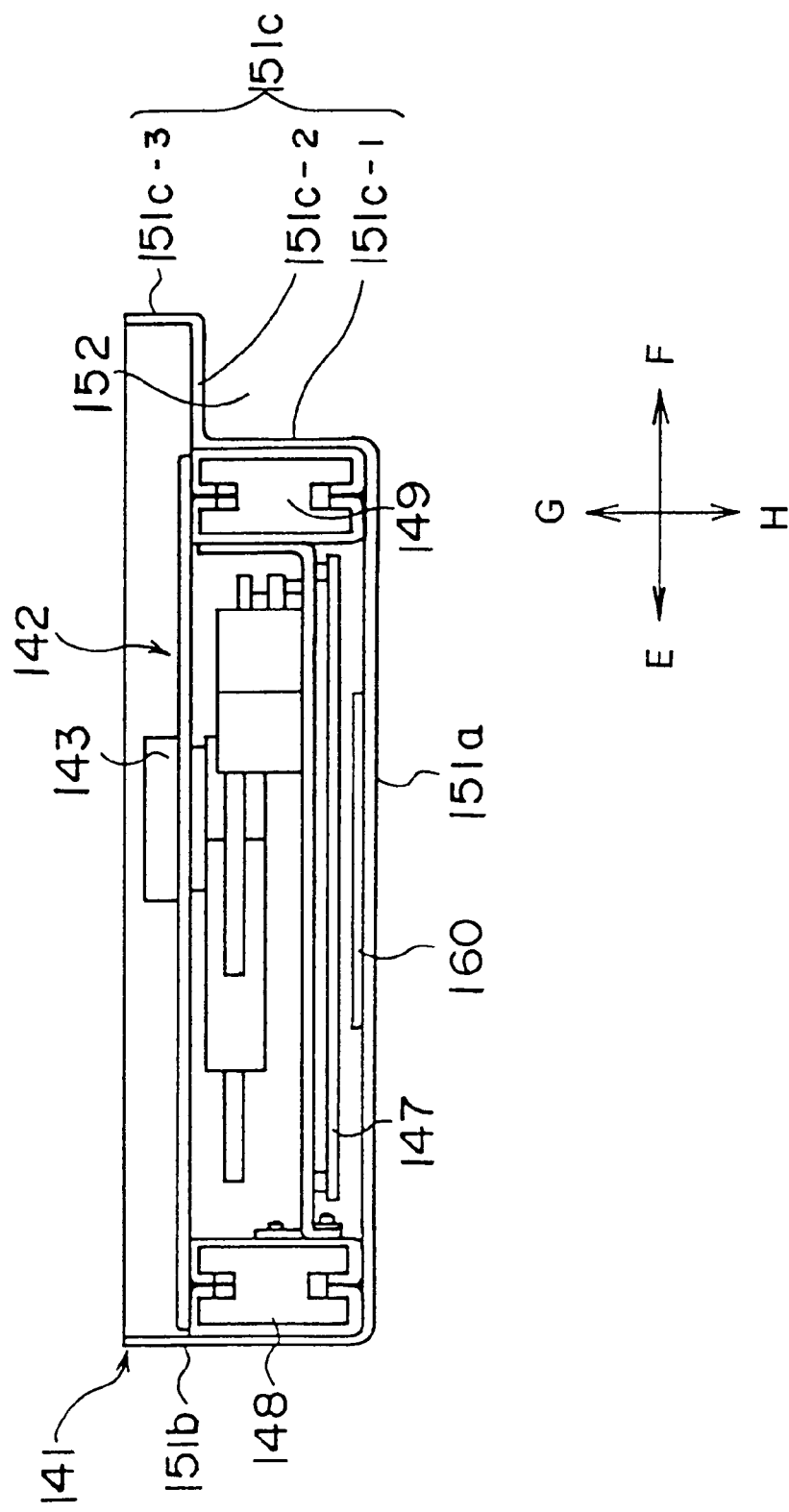
FIG. 7 is a cross-sectional view of the CD-ROM disk device taken along a line VII—VII in FIG. 4.

FIG. 4 shows the CD-ROM disk device 140 when the moving unit 142 is placed at an inserted position. FIG. 5 shows the CD-ROM disk device 140 when the moving unit 142 is manually moved in an eject direction to a disk-change position. FIG. 6 is a top view of the CD-ROM disk device shown in FIG. 5. FIG. 7 is a cross-sectional view of the CD-ROM disk device 140 taken along a line VII—VII in FIG. 4.

Referring to FIGS. 3 through 7, the moving unit 142 is a mechanical-parts carrying tray on which a CD-ROM (not shown) that is a computer-readable recording medium is held. Electrical parts are provided on the moving unit 142, and the electrical parts on the moving unit 142 include an optical pickup 144, a disk motor 145, and a pickup moving member 146. The CD-ROM (not shown) is held by a turn table 143 and rotated by the disk motor 145 when the disk device 140 is operated. These electrical parts are operated to reproduce information from the CD-ROM on the moving unit 142.

The chassis 141 has a first printed circuit board 150 provided at a rear base portion of the chassis 141, the first printed circuit board 150 being fixed to the chassis 141 by fastening screws. The moving unit 142 has a second printed circuit board 147 provided on a bottom surface of the moving unit 142. The electrical parts of the moving unit 142 are electrically connected to the second printed circuit board 147.

As shown in FIGS. 4, 5 and 6, the moving unit 142 is movably supported by guide rails 148 and 149 on sides of the chassis 141. The moving unit 142 is arranged so that the moving unit 142 is movable relative to the chassis 141 between a disk-change position "P1" and an inserted position "P2" in both an eject direction "A" and an insert direction "B".

As shown in FIG. 7, the chassis 141 includes a base plate 151a on the bottom of the chassis, a side wall 151b at the left side of the chassis, and a stepped side wall 151c at the right side of the chassis. The stepped side wall 151c includes a first wall portion 151c-1 vertically extending from an end of the base plate 151a, a side plate portion 151c-2 horizontally extending in the direction "F" from an end of the first wall portion 151c-1, and a second wall portion 151c-3 vertically extending from an end of the side plate portion 151c-2.

The chassis 141 includes a lowered hollow portion 152 which is formed by the stepped side wall 151c. The lowered hollow portion 152 of the chassis 141 is formed to arrange electrical parts of the personal computer when the CD-ROM disk device 140 is installed into the casing of the personal computer. The guide rail 148 and the guide rail 149, which movably support the moving unit 141, are arranged onto the insides of the side wall 151b and the first wall portion 151c-1, respectively.

In the above-described CD-ROM disk device 140, a flexible printed circuit (FPC) cable 160 electrically connects the first printed circuit board 150 of the chassis 141 and the second printed circuit board 147 of the moving unit 142. As shown in FIGS. 5, 6 and 7, the FPC cable 160 is attached to the base plate 151a of the chassis 141.

Figure 8:
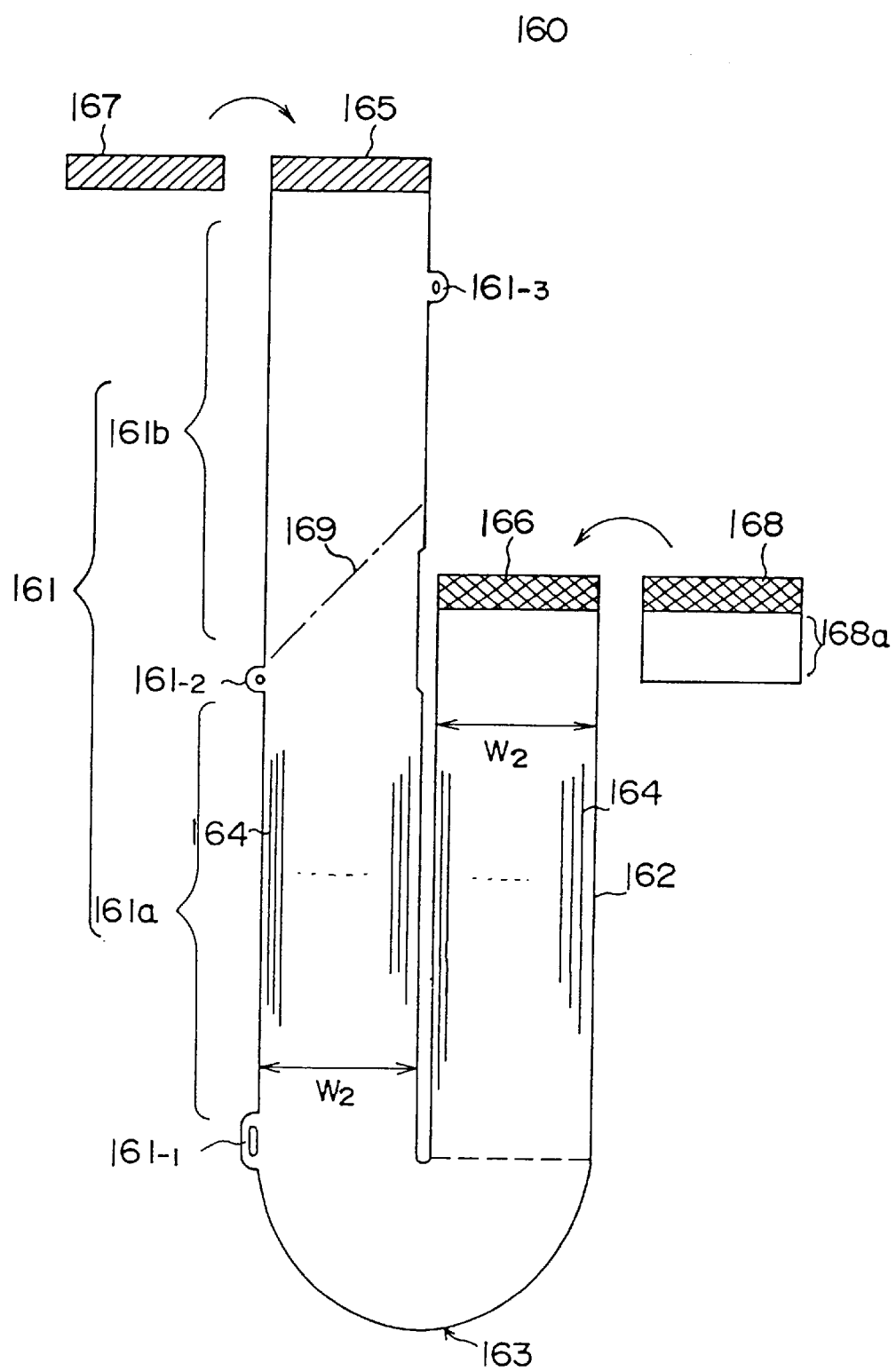
FIG. 8 is a diagram of a flexible printed circuit cable of the CD-ROM disk device in FIG. 3.

FIG. 8 shows a configuration of this flexible printed circuit (FPC) cable 160 of the CD-ROM disk device 140. As shown in FIG. 8, the FPC cable 160 has a single-layer structure and has a generally U-shaped formation.

Referring to FIG. 8, the FPC cable 160 includes a first arm portion 161, a second arm portion 162, and a circular portion 163. The first arm portion 161 and the second arm portion 162 are extending straight in parallel with each other. The circular portion 163 interconnects the first arm portion 161 and the second arm portion 162. In FIG. 8, a width of each of the first arm portion 161 and the second arm portion 162 is indicated by the arrow "W2".

Figure 1:
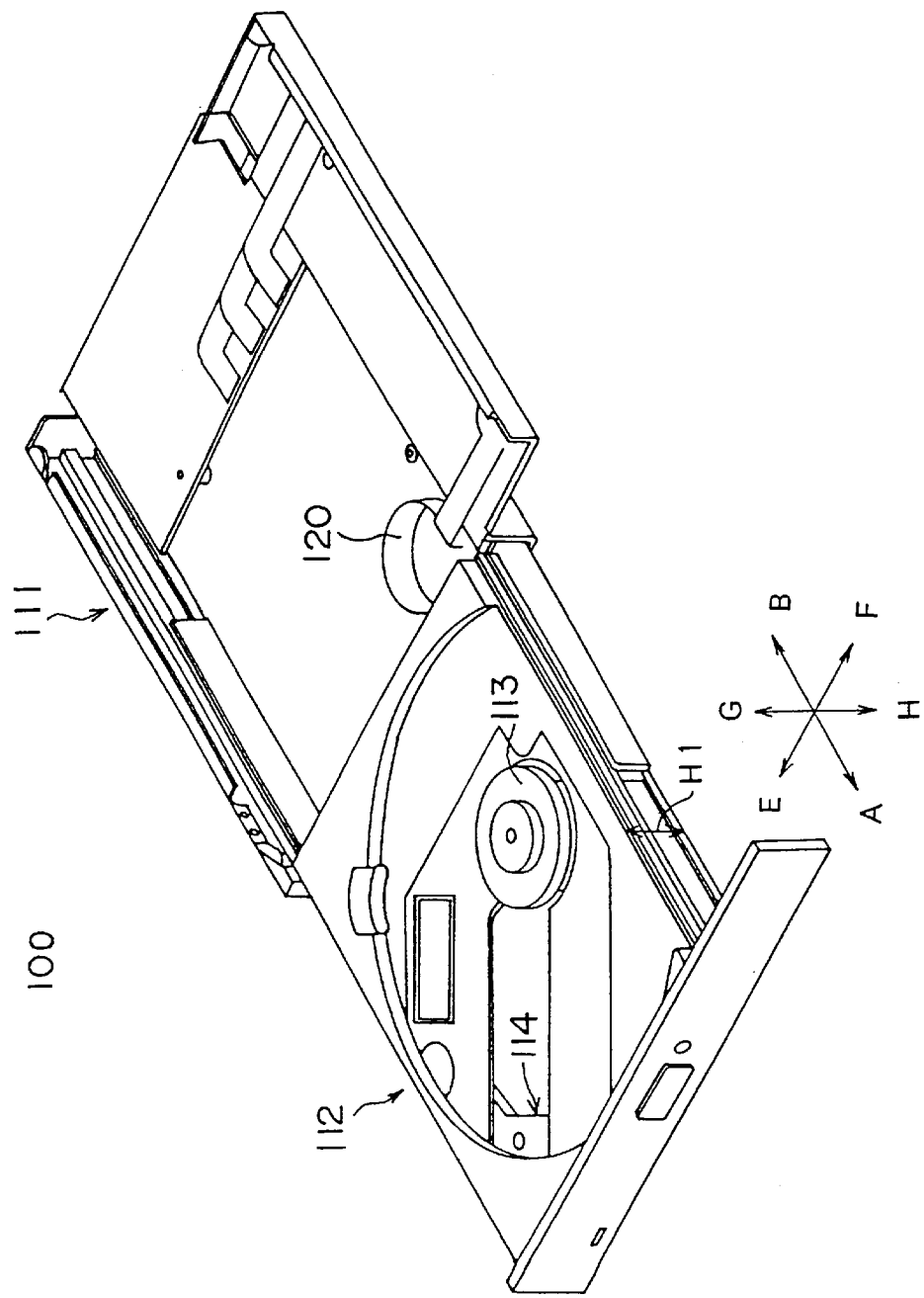
FIG. 1 is a perspective view of a conventional CD-ROM disk device.
Figure 2:
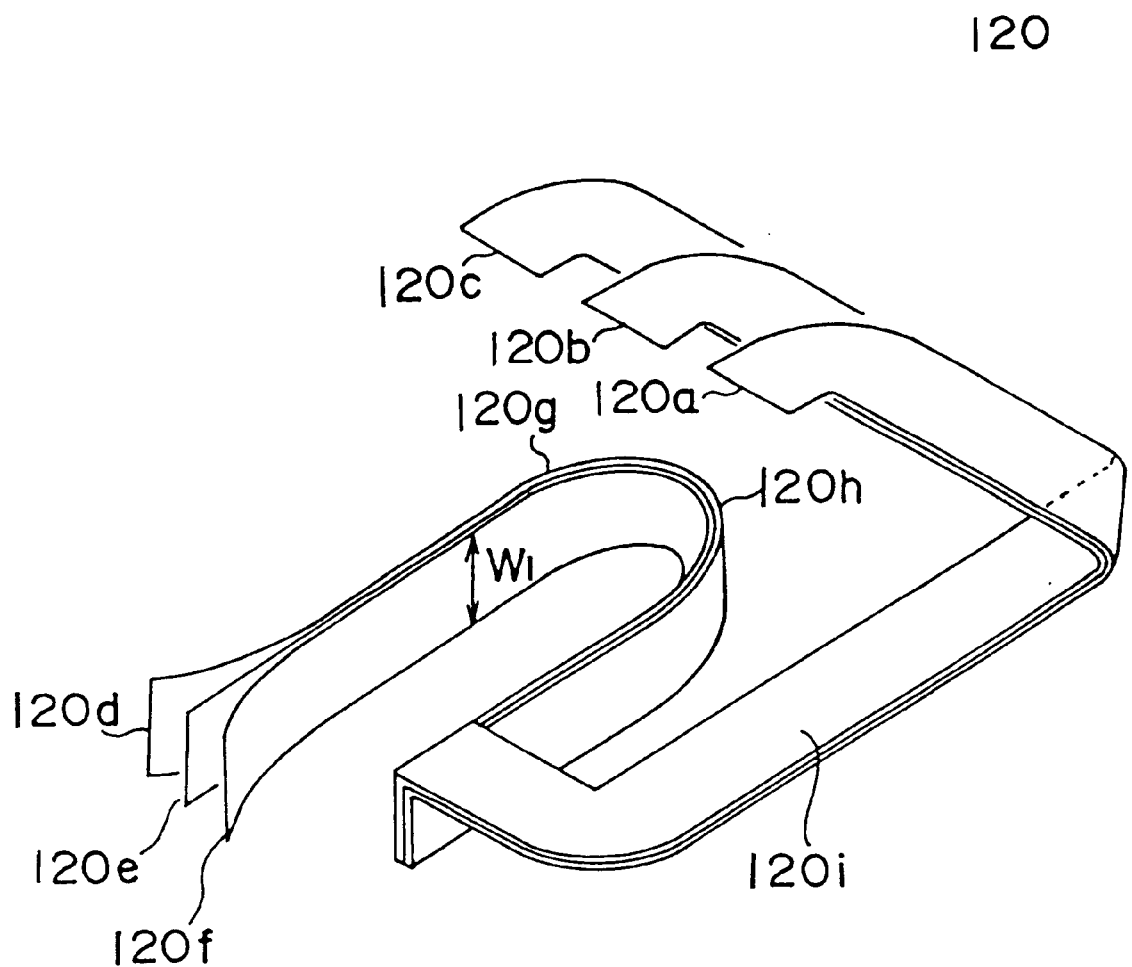
FIG. 2 is a perspective view of the conventional CD-ROM disk device in FIG. 1.

Since the FPC cable 160 has a flat structure and is attached to the base plate 151a of the chassis 141, it is possible to make the width "W2" of each of the first arm portion 161 and the second arm portion 162 great enough to include a total number of wires 164 required for the electrical connections between the first printed circuit board 150 and the second printed circuit board 147. As described above, the FPC cable 120 in the conventional CD-ROM disk drive 100, shown in FIG. 2, must have the limited amount of width "W1" and the multiple-layer structure in order to include the required number of wires (e.g., 43 wires). However, the FPC cable 160 of the present embodiment can have the width "W2": that is approximately three times as great as the width "W1" of the FPC cable 120. The FPC cable 160 of the present embodiment can have the single-layer structure including the required number of wires 164, and the FPC cable 160 has a simple, single-layer structure and provides a small height for the CD-ROM disk device 140. It is unnecessary to provide a FPC cable having a multiple-layer structure. Further, the CD-ROM disk device 140 having the FPC cable 160 of the present embodiment is less expensive than the conventional CD-ROM disk device 100 having the FPC cable 120.

The FPC cable 160 includes a connector portion 165 at a leading edge of the first arm portion 161, and a connector portion 166 at a leading edge of the second arm portion 162. A reinforcing plate 167 is attached to the connector portion 165 by adhesive agent. A reinforcing plate 168 is attached to the connector portion 166 by adhesive agent. The reinforcing plate 168 is greater than the reinforcing plate 167, and the reinforcing plate 168 includes a restricting portion 168a. The FPC cable 160 includes locating holes 161-1, 161-2 and 161-3 which are formed at longitudinally spaced positions of the first arm portion 161.

Figure 9:
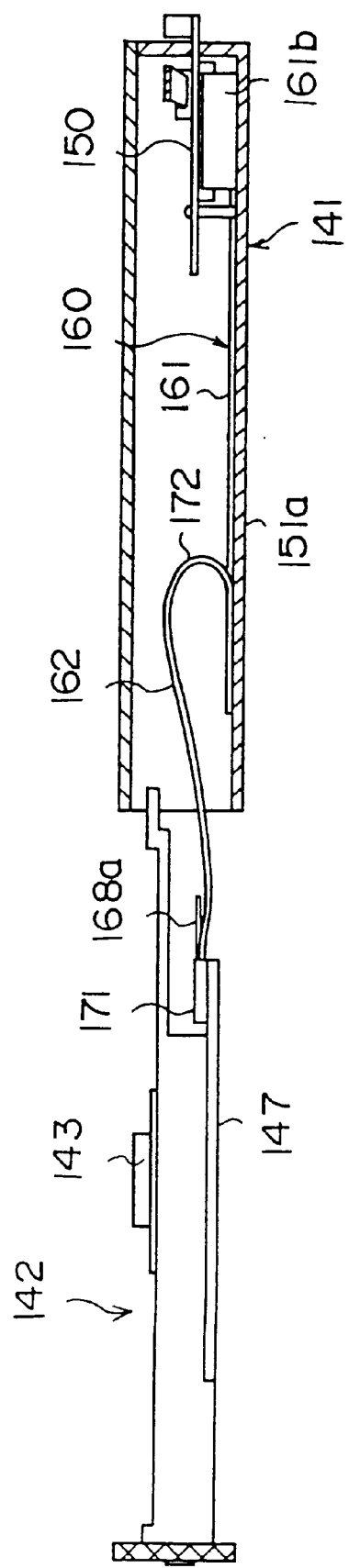
FIG. 9 is a diagram of the flexible printed circuit cable of the CD-ROM disk device when the moving unit is moved to the disk-change position.

FIG. 9 shows the flexible printed circuit cable 160 of the CD-ROM disk device 140 when the moving unit 142 is moved in the eject direction A to the disk-change position Pl.

Referring to FIGS. 6 and 8, the first arm portion 161 of the FPC cable 160 has a first half region 161a between the locating holes 161-1 and 161-2 and a second half region 161b between the locating holes 161-2 and 161-3. The first half region 161a is attached to the base plate 151a of the chassis 141, and the locating holes 161-1 and 161-2 are fitted into locating pins provided at holes 151a-1 and 151a-2 of the base plate 151a. By this locating operation, the first half region 161a of the FPC cable 160 on the base plate 151a of the chassis 141 is located at the correct position.

The FPC cable 160 is folded along a line 169 so that the second half region 161b is laid over the first half region 161a so as to extend in the direction F. Similarly to the first half region 161a, the second half region 161b is attached to the base plate 151a of the chassis 141, and the locating hole 161-3 is fitted into a locating pin provided at a hole 151a-3 of the base plate 151a. By this locating operation, the location of the second half region 161b of the FPC cable 160 on the base plate 151a of the chassis 141 is determined. As shown in FIG. 9, the second half region 161b is located under the first printed circuit board 150 of the chassis 141.

As shown in FIG. 6, the second arm portion 162 of the FPC cable 160 is folded back so that the folded portion extends in the direction A. The first printed circuit board 150 of the chassis 141 has a connector 170 provided on the bottom surface of the first printed circuit board 150. The second printed circuit board 147 of the moving unit 142 has a connector 171 provided on the top surface of the second printed circuit board 147.

The connector portion 165 of the FPC cable 160 with the reinforcing plate 167 attached thereto is fitted to the connector 170 of the first printed circuit board 150. Thus, the electrical connections between the first printed circuit board 150 of the chassis 141 and the FPC cable 160 are accomplished by the connector portion 165 and the connector 170 which are fitted to each other.

As shown in FIGS. 6 and 9, the second arm portion 162 of the FPC cable 160 is folded back to extend in the eject direction A so that a curved portion 172 is formed at the folded position. The connector portion 166 of the FPC cable 160 with the reinforcing plate 168 attached thereto is fitted to the connector 171 of the second printed circuit board 147. The electrical connections between the second printed circuit board 147 of the moving unit 142 and the FPC cable 160 are accomplished by the connector portion 166 and the connector 171 which are fitted to each other.

Accordingly, the electrical connections between the first printed circuit board 150 and the second printed circuit board 147 are accomplished by the FPC cable 160 under the condition in which the moving unit 142 is movable relative to the chassis 141.

FIGS. 10A and 10B show conditions of the flexible printed circuit cable 160 when the moving unit 142 is moved between the disk-change position P1 and the inserted position P2 in the eject direction A or the insert direction B.

As shown in FIGS. 10A and 10B, when the moving unit 142 is moved between the disk-change position P1 and the inserted position P2 in the eject direction A or the insert direction B, the conditions of the FPC cable 160 provided under the moving unit 142 are changed so that the position of the curved portion 172 of the FPC cable 160 relative to the chassis 141 is moved in the direction A or the direction B.

More specifically, when the moving unit 142 is moved in the eject direction A toward the disk-change position P1, the curved portion 172 of the FPC cable 160 approaches the rear end of the chassis 141. The restricting portion 168a extending rearward from the connector 171 serves to prevent the second arm portion 162 of the FPC cable 160 from being upwardly bulged when the curved portion 172 approaches the connector portion 166. The flat structure of the FPC cable 160 is maintained by the restricting portion 168a as shown in FIG. 10A.

On the other hand, when the moving unit 142 is moved in the insert direction B toward the inserted position P2, the curved portion 172 of the FPC cable 160 is safely placed under the first printed circuit board 150 without interfering with the first printed circuit board 150 as shown in FIG. 10B. By this construction, it is possible to provide a great width (indicated by the arrow "W3" in FIG. 5) for the first printed circuit board 150 being installed in the chassis 141.

In addition, in the CD-ROM disk device 140 of the above-described embodiment, as shown in FIGS. 4, 5 and 6, a strap unit 180 which is used to perform an initial setting of the CD-ROM disk device 140 is provided on the side plate portion 151c-2 at the rear end thereof.

In the above-described embodiment, the FPC cable 160 having the flat, single-layer structure is arranged on the base plate 151a of the chassis 141. It is unnecessary to arrange the FPC cable 160 on the side plate portion 151c-2. It is possible to design the CD-ROM disk device 140 in which the bottom surface of the CD-ROM held on the turn table 143 is placed above the side plate portion 151c-2. Accordingly, the CD-ROM disk device of the present embodiment can provide a small height for the disk device because it includes the FPC cable 160 having a flat structure. Further, the CD-ROM disk device of the present invention can provide a reduced manufacturing cost because it includes the FPC cable 160 having a single-layer structure which is less expensive than the multiple-layer structure FPC cable 120 of the conventional disk device.

Next, a description will be given of a CD-ROM disk device to which another embodiment of the present invention is applied with reference to FIGS. 11 through 26B.

Figure 11:
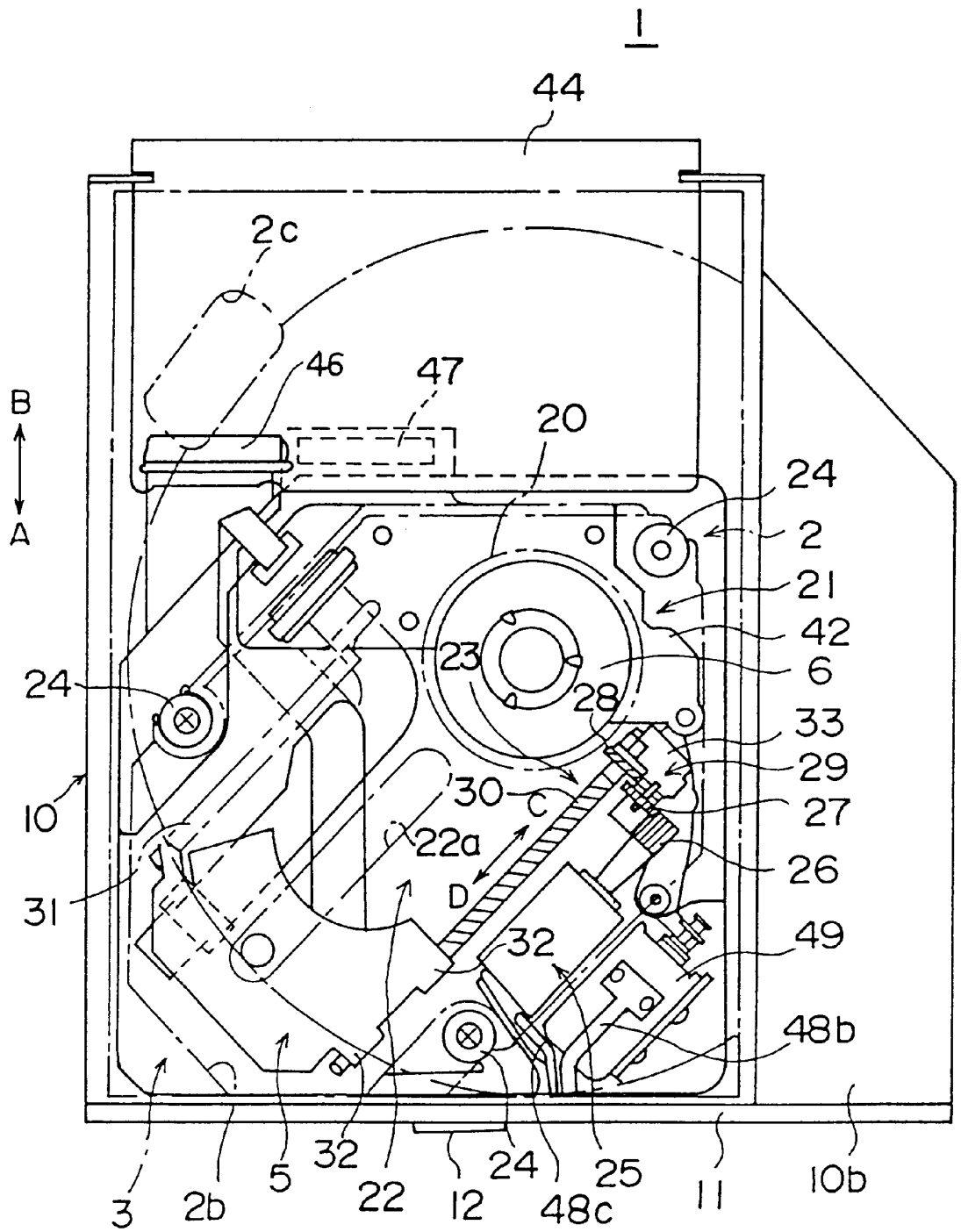
FIG. 11 is a top view of a CD-ROM disk device to which another embodiment of the present invention is applied.
Figure 12:
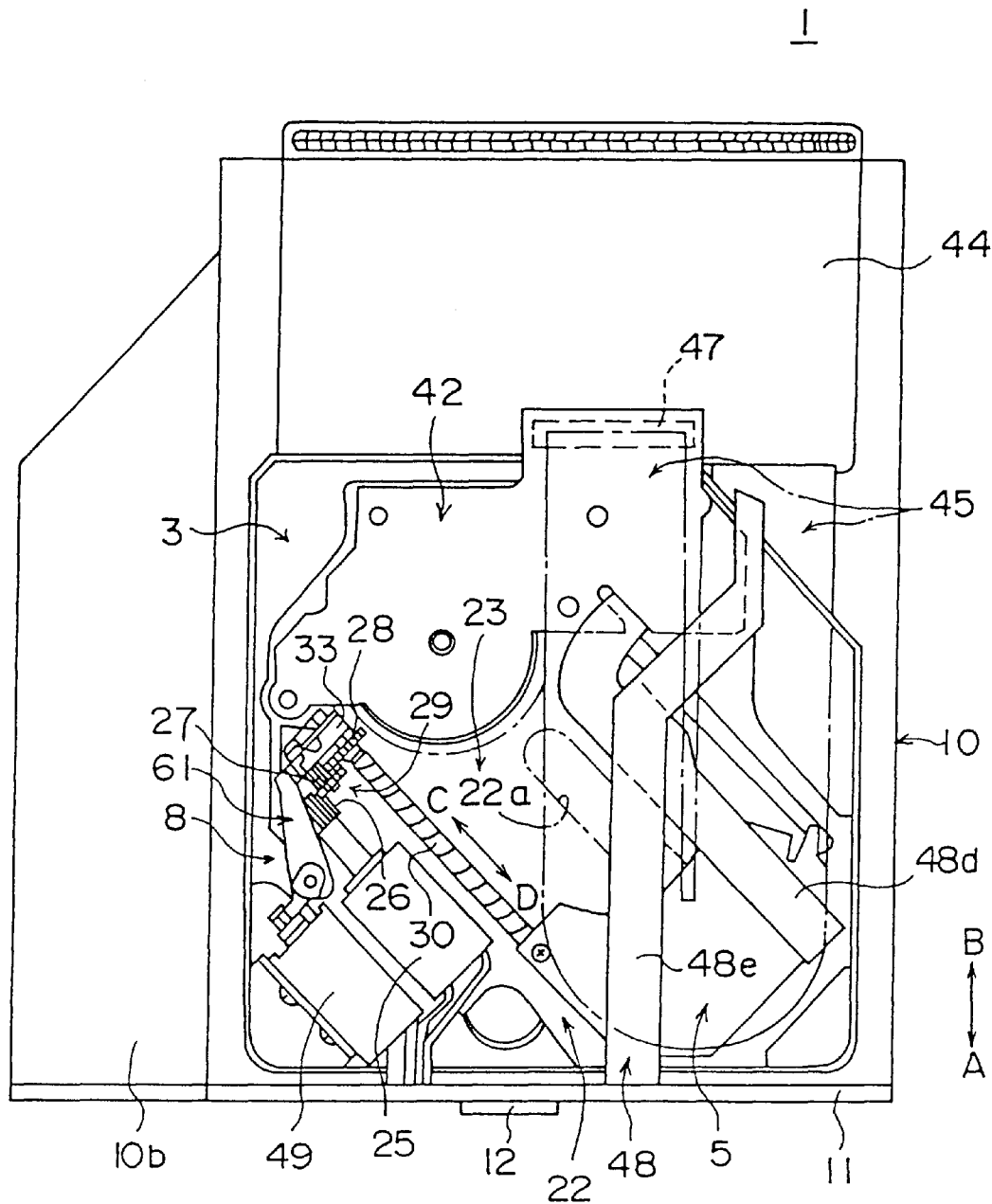
FIG. 12 is a bottom view of the CD-ROM disk device in FIG. 11.
Figure 13:
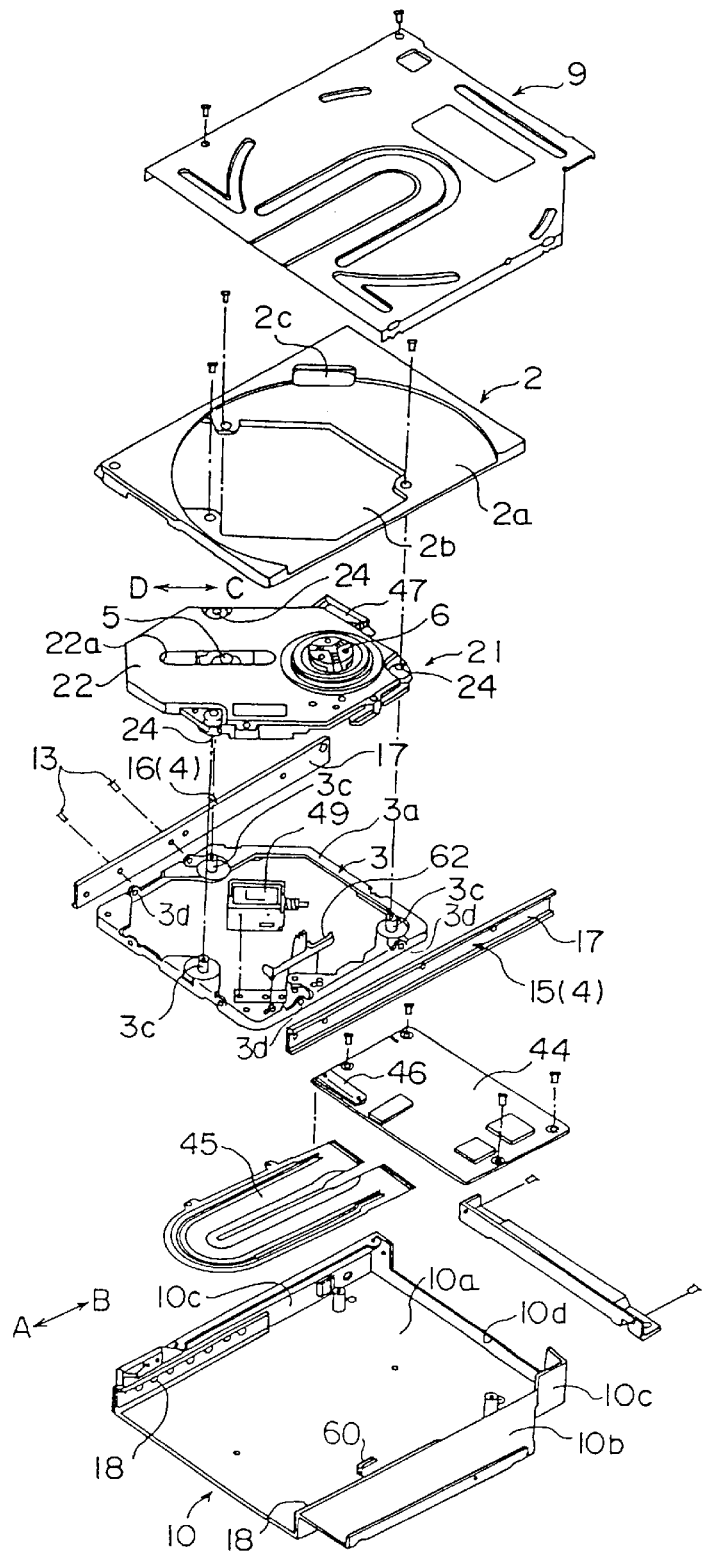
FIG. 13 is an exploded perspective view of the CD-ROM disk device in FIG. 11.

FIG. 11 is a top view of a CD-ROM disk device 1 to which another embodiment of the present invention is applied. FIG. 12 is a bottom view of the CD-ROM disk device 1. FIG. 13 is an exploded perspective view of the CD-ROM disk device 1.

Referring to FIGS. 11, 12 and 13, the CD-ROM disk device 1 is a built-in type that is built in a casing of a notebook-size personal computer. The CD-ROM disk device 1 generally has a tray 2, a sub-chassis 3, a tray sliding unit 4, a pickup unit 5, a turn table 6, a tray pushing unit 7 (shown in FIGS. 19 and 20), and a tray locking unit 8.

The tray 2 is a disk-carrying member on which a CD-ROM (not shown) is held. The tray 2 is supported on the sub-chassis 3. The pickup unit 5 and the turn table 6 are mounted on a drive unit 21. The moving unit 142 of the previous embodiment in FIG. 3 is constituted by the tray 2, the sub-chassis 3 and the drive unit 21 in the present embodiment.

The tray 2 is movably supported by the tray sliding unit 4 on a chassis 10. The pickup unit 5 is supported on the sub-chassis 3 by the tray sliding unit 4. The turn table 6 which rotates the CD-ROM on the tray 2 is supported on the sub-chassis 3 by the tray sliding unit 4.

Similarly to the previous embodiment in FIG. 3, the moving unit of the present embodiment is movably arranged in the disk device 1 so that the moving unit, including the tray 2, is movable between a disk-change position and an inserted position in both the eject direction and the insert direction, which are indicated by the arrow A and the arrow B in FIG. 11, respectively.

The tray pushing unit 7 pushes the tray 2 in the eject direction A by an actuating force of a spring. The tray locking unit 8 locks the tray 2 when the moving unit is at the inserted position. When the moving unit is manually moved to the disk-change position, the tray pushing unit 7 locks the tray 2 at the disk-change position. The functions of the tray pushing unit 7 and the tray locking unit 8 will be described later.

FIG. 11 shows the top of the CD-ROM disk device 1 when the moving unit including the tray 2 is at the inserted position, wherein a cover plate 9 (shown in FIG. 13) covering the tray 2 is removed therefrom. The CD-ROM disk device 1 reproduces information from a CD-ROM when the moving unit is at this inserted position, and the position of the tray 2 within the CD-ROM disk device 1 is indicated by a dotted chain line in FIG. 11. The position of the CD-ROM held on the tray 2 is also indicated by a dotted chain line in FIG. 11. In addition, FIG. 12 shows the bottom of the CD-ROM disk device 1 when the moving unit is at the inserted position.

As shown in FIGS. 11, 12 and 13, the tray 2 is configured in a non-symmetrical form such that the CD-ROM on the tray 2 partially projects from the right side of the tray 2. The tray 2 has a lateral width that is smaller than an outside diameter of the CD-ROM.

The tray 2 is movably supported on the chassis 10 by the tray sliding unit 4 so that the tray 2 is movable relative to the chassis 10 between the disk-change position and the inserted position in both the eject direction A and the insert direction B.

In the CD-ROM disk device 1 of the present embodiment, the tray 2 can be manually moved in both the eject direction A and the insert direction B. In the CD-ROM disk device 1, a tray moving mechanism which automatically moves the tray 2 in the eject direction A or the insert direction B is not used. Thus, the CD-ROM disk device 1 of the present embodiment provides a reduction of the total number of parts required for the CD-ROM disk device 1.

As shown in FIG. 13, the chassis 10 includes a base portion 10a and a cover portion 10b. The above-described moving unit including the tray 2 is accommodated in the base portion 10a. The bottom of the projecting portion of the CD-ROM on the tray 2 is protected by the cover portion 10b. The chassis 10 includes a lowered hollow portion provided below the cover portion 10b at the right side of the chassis 10. In this lowered hollow portion of the chassis 10, other parts of the personal computer when installing the CD-ROM disk device 1 in the personal computer are arranged.

A front bezel 11 is provided in front of the tray 2 and fixed to the tray 2. The front bezel 11 is moved together with the tray 2 when the tray 2 is moved in the eject direction A or the insert direction B. A slide-type eject switch 12 is arranged in the middle of the front bezel 11. This eject switch 12 is slid by an operator along the surface of the front bezel 11 to unlock the tray 2 from the tray locking unit 8 (which will be described later) before the tray 2 is ejected from the chassis 10 in the eject direction A.

When the eject switch 12 is slid by the operator on the CD-ROM disk device 1 shown in FIGS. 11 and 12, the tray 2 is unlocked from the tray locking unit 8 so that the tray 2 and the front bezel 11 are ejected from the chassis 10 in the eject direction A by the tray pushing unit 7. After the tray 2 and the front bezel 11 are moved in the eject direction, the operator can easily move the tray 2 further in the eject direction A to the disk-change position by an manual operation.

As shown in FIG. 13, the tray 2 includes a recessed disk-holding surface 2a, a drive-unit opening 2b, and a recessed portion 2c. The drive-unit opening 2b is formed by perforating the disk-holding surface 2a, and the recessed portion 2c is formed by cutting a peripheral portion of the disk-holding surface 2a. The CD-ROM which is inserted in the CD-ROM disk device 1 is fitted to the disk-holding surface 2a of the tray 2. The drive unit 21 on which the pickup unit 5 and the turn table 6 are mounted is fitted to the drive-unit opening 2b. The recessed portion 2c of the tray 2 is provided to insert a finger of the operator into the same when removing the CD-ROM from the tray 2.

The disk-holding surface 2a of the tray 2 is arranged so that it has a lateral width smaller than the outside diameter of the CD-ROM so as to cover the base portion 10a of the chassis 10. The disk-holding surface 2a has an area that covers about two-thirds of the overall area of the CD-ROM. Since the tray 2 has such a configuration, it provides a small size for the CD-ROM disk device 1.

Figure 22:
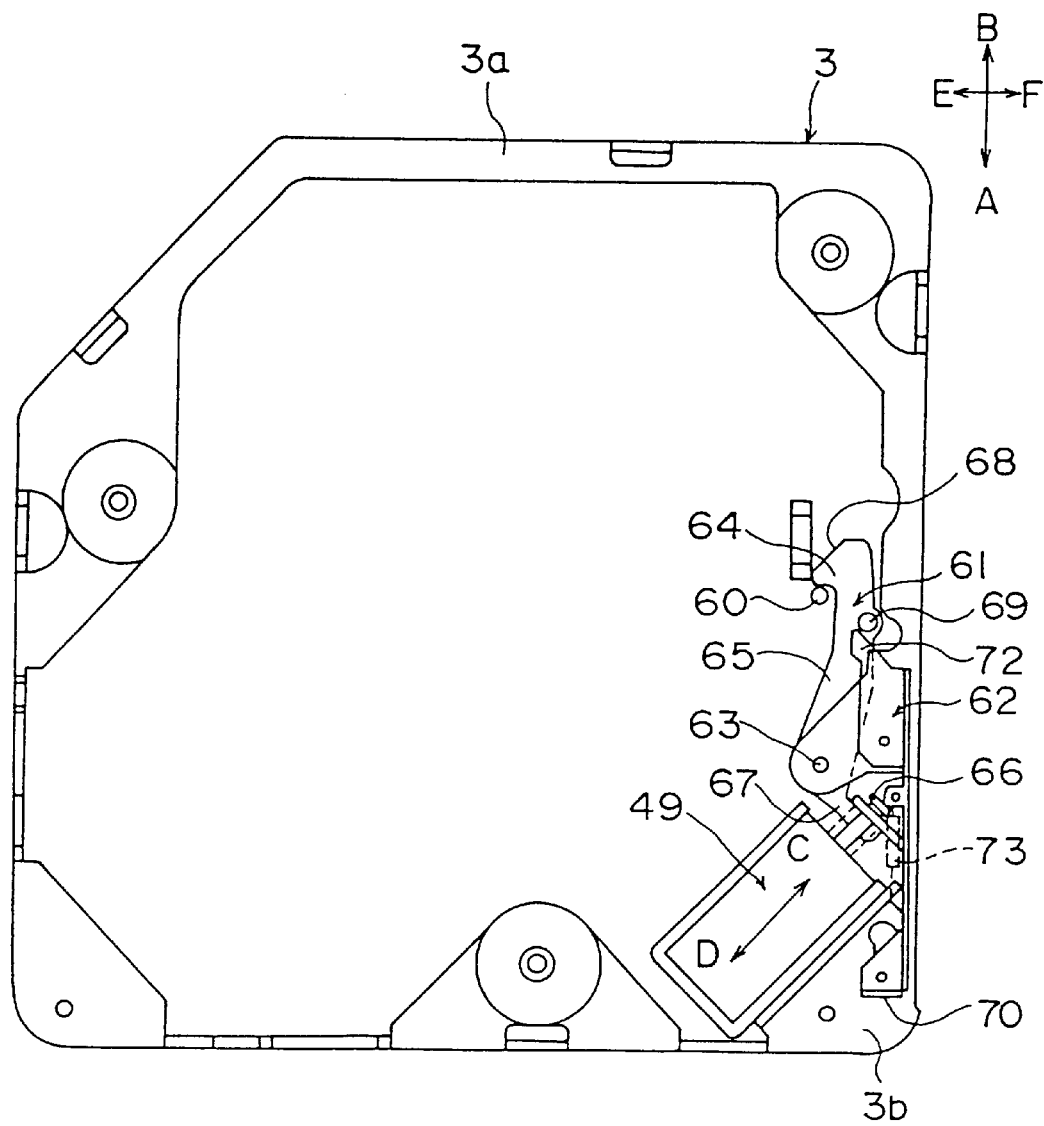
FIG. 22 is a top view of the sub-chassis and the tray locking unit.

As shown in FIG. 13, the sub-chassis 3 includes a rectangular frame 3a, a tray-locking-unit mounting surface 3b, a number of bosses 3c, and a number of screw holes 3d. The tray 2 is supported on and fixed to the sub-chassis 3. The rectangular frame 3a includes a generally rectangular hole to which the drive unit 21 including the pickup unit 5 and the turn table 6 is fitted. The mounting surface 3b is formed on the frame 3a of the sub-chassis 3 (as shown in FIGS. 21 and 22), and the tray locking unit 8 is arranged on the mounting surface 3b. The bosses 3c are used to fasten the drive unit 21 to the sub-chassis 3. The screw holes 3d are formed in the frame 3a and used to fasten the tray sliding unit 4 to the sub-chassis 3 by the screws 13.

As shown in FIG. 13, the tray sliding unit 4 includes a pair of guide members 15 and 16 which are mounted on both sides of the sub-chassis 3. The guide members 15 and 16 are fastened to the sub-chassis 3 by fitting the screws 13 to the screw holes 3d.

Figure 14:
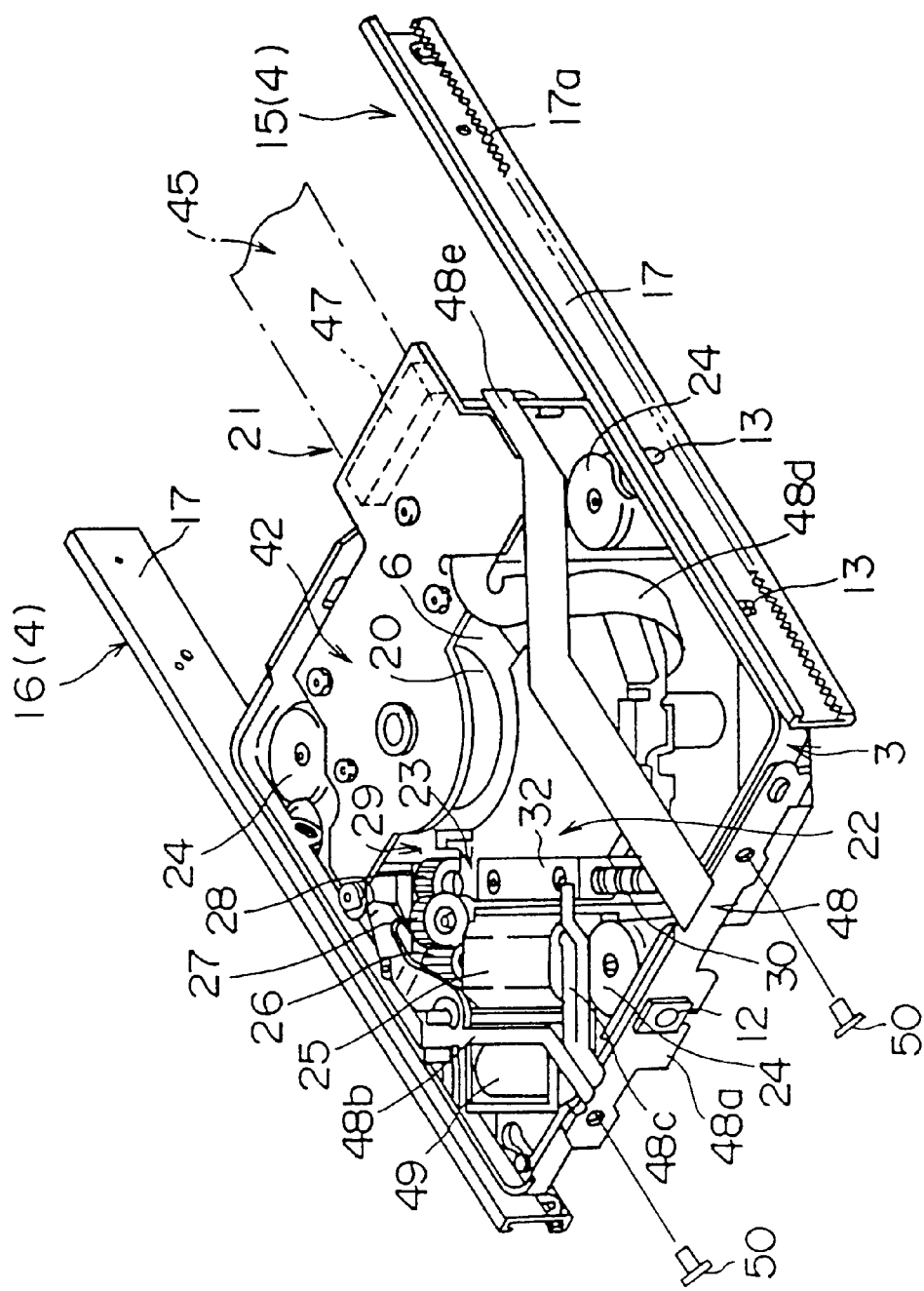
FIG. 14 is a perspective bottom view of a sub-chassis on which a drive unit is mounted.
Figure 19:
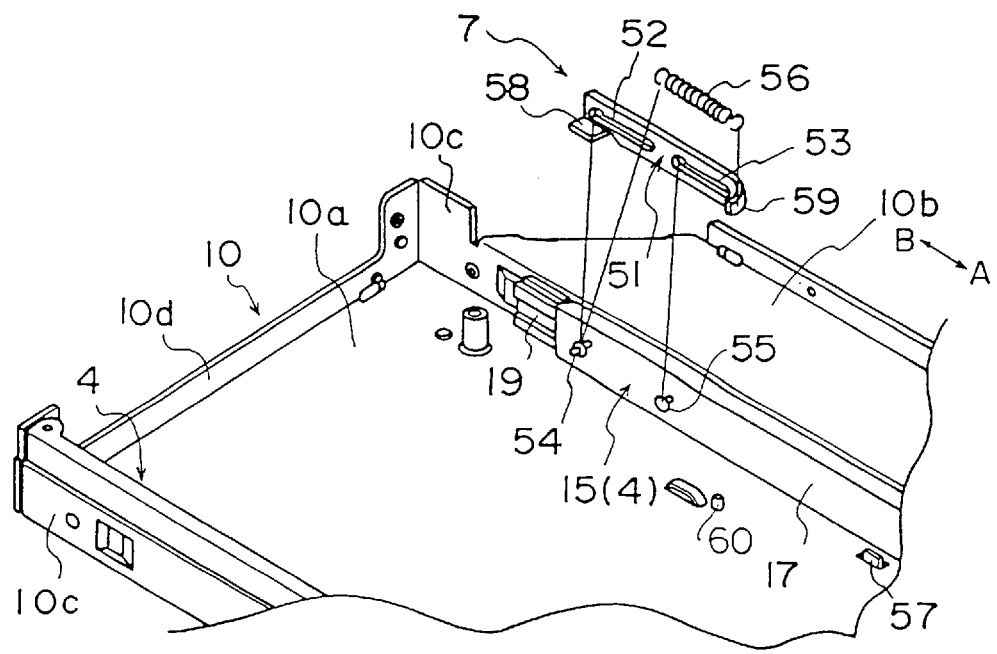
FIG. 19 is a perspective view of a tray sliding unit and a tray pushing unit of the CD-ROM disk device.

Each of the guide members 15 and 16 includes a movable rail 17 secured to the sub-chassis 3 and a fixed rail 18 fixed to a side wall 10c of the chassis 10. The movable rail 17 and the fixed rail 18 are arranged such that they extend in parallel with each other along the side wall 10c of the chassis 10. A slide rail 19 is, as shown in FIG. 19, provided between the movable rail 17 and the fixed rail 18 such that the slide rail 19 is movable to the movable rail 17 and to the fixed rail 18. As shown in FIG. 14, the movable rails 17 and the fixed rails 18 have a C-shaped cross-section, and each of the movable rails 17 has a rack portion 17a. The slide rail 19 has an H-shaped cross-section, and the movable rail 17 and the fixed rail 18 are connected via the slide rail 19. The slide rail 19 has a pinion (not shown) in the middle of the slide rail 19, and the pinion is engaged with the rack portion 17a of the movable rail 17.

In the CD-ROM disk device 1 of the present embodiment, the moving unit, including the tray 2 and the sub-chassis 3, is movably supported on the chassis 10 by using the tray sliding unit 4. By making use of the guide members 15 and 16 of the tray sliding unit 41 the moving unit can be arranged in the disk device 1 so that the moving unit is movable between the inserted position and the disk-change position in both the insert direction B and the eject direction A.

In the CD-ROM disk device 1 of the present embodiment, it is necessary to provide a mechanism which prevents the tray 2 from being further moved in the eject direction A when the tray 2 is manually moved in the eject direction A to the disk-change position. The tray pushing unit 7 serves to prevent the tray 2 at the disk-change position from being further moved in the eject direction A, which will be described later.

Figure 15:
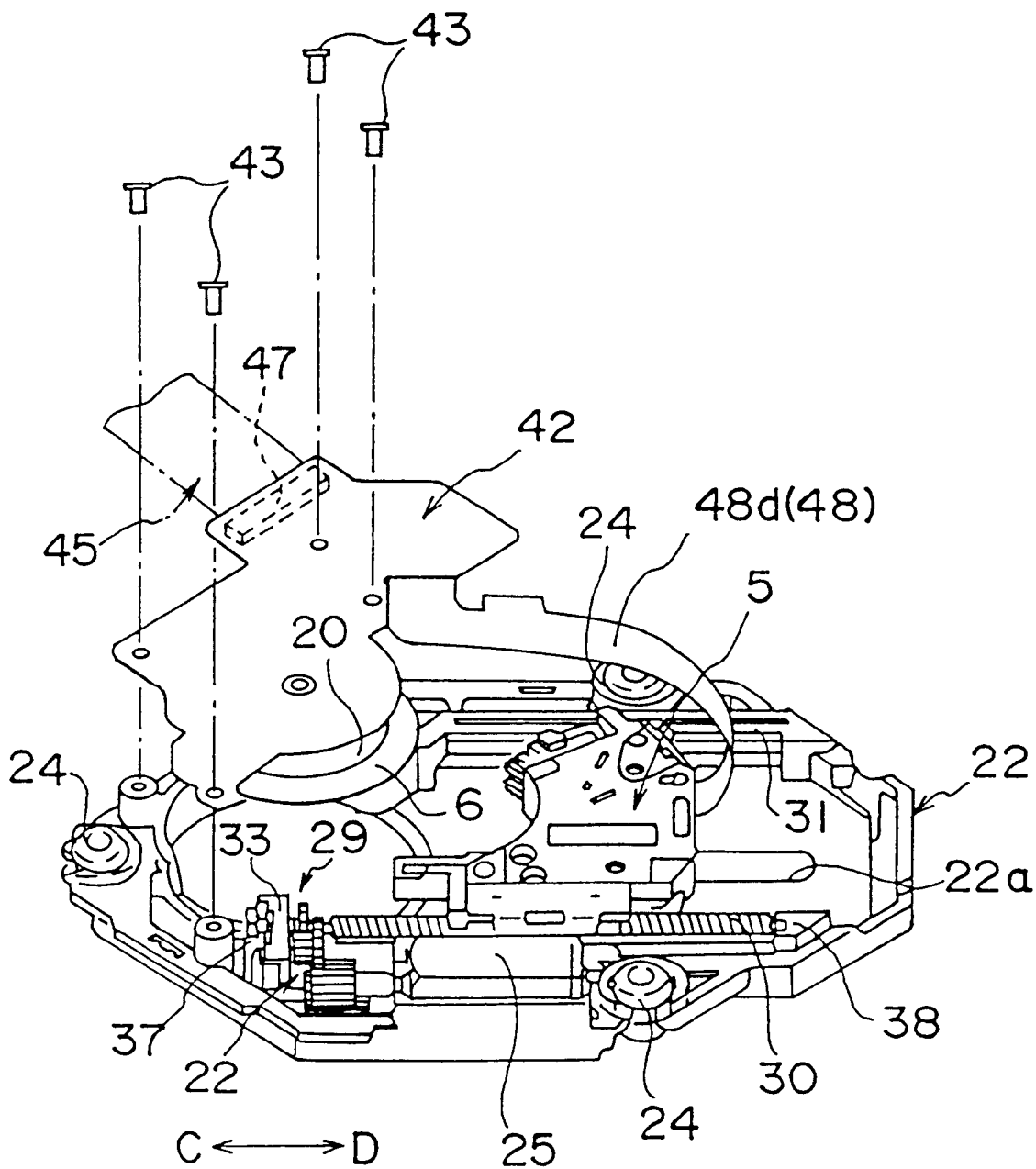
FIG. 15 is a perspective bottom view of the drive unit on the sub-chassis.

FIG. 15 shows the bottom of the drive unit 21 which is arranged on the sub-chassis 3. As described above, the pickup unit 5 and the turn table 6 are supported on the drive unit 21, and this drive unit 21 is arranged on the sub-chassis 3.

As shown in FIG. 15, the drive unit 21 includes the turn table 6, a base 22, the pickup unit 5, a pickup moving unit 23, and a disk motor 20. The base 22 is arranged on the sub-chassis 3. The pickup unit 5 is movably supported on the base unit 22. The pickup moving unit 23 moves the pickup unit 5 in a radial direction of the CD-ROM on the tray 2. The disk motor 20 rotates the turn table 6 so that the CD-ROM held on the tray 2 is rotated.

The tray 2 is mounted on the base 22 of the drive unit 21. A set of vibration absorbing members 24 is provided between the sub-chassis 3 and the base 22, and the vibration absorbing members 24 are at positions corresponding to the positions of the bosses 3c of the sub-chassis 3. Since the vibration of the drive unit 21 when the tray 2 is slid is absorbed by the vibration absorbing members 24, any influence of the vibration of the drive unit 21 detrimental to the operations of the pickup unit 5 and the turn table 6 is reduced by the vibration absorbing members 24.

The base 22 of the drive unit 21 is made of a glass-fiber filled resin material such that the base 22 of the glass-fiber filled resin material has a coefficient of thermal expansion substantially the same as a coefficient of thermal expansion of the pickup unit 5 or the turn table 6. The use of such a resin material of the base 22 is to maintain the positions of the pickup unit 5 and the turn table 6 on the base 22 at a high level of accuracy even when a thermal condition of the environment of the CD-ROM disk device 1 is changed.

The pickup moving unit 23 moves the pickup unit 5 in one of radial directions of the CD-ROM indicated by the arrow C and the arrow D in FIG. 15. The pickup moving unit 23 has a pickup moving motor 25 arranged on the bottom of the base 22. The pickup moving motor 25 includes a drive shaft on which a gear 26 is supported. The pickup moving unit 23 includes a pickup drive mechanism 29 having a gear 27 and a gear 28. A lead screw 30 is rotated by the pickup moving motor 25 via the pickup drive mechanism 29. A pickup guide unit 31 which is extending in parallel with the lead screw 30 serves to guide the movement of the pickup unit 5. The drive unit 21 including the above-mentioned elements is arranged so as to have an integral structure.

The pickup unit 5 has a threaded connecting portion 32 which is engaged with a threaded portion of the lead screw 30. Since the lead screw 30 is rotated by the pickup moving motor 24 via the pickup drive mechanism 29, the pickup unit 5 is moved in one of the radial directions C and D of the CD-ROM by the pickup moving unit 23.

The base 22 of the drive unit 21 has a slot 22a, and the pickup unit 5 is moved along this slot 22a in order to access the CD-ROM. The movement of the pickup unit 5 is restricted by the position of this slot 22a in the drive unit 21.

Figure 16:
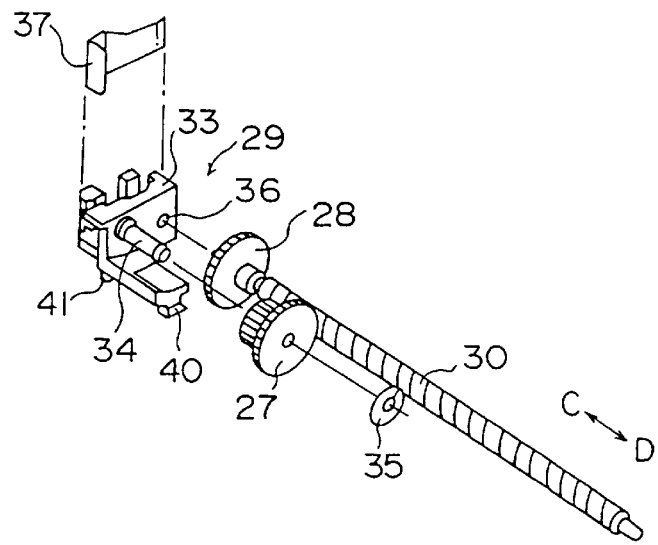
FIG. 16 is a perspective view of a pickup moving member of the CD-RIM disk device in FIG. 11.
Figure 17:
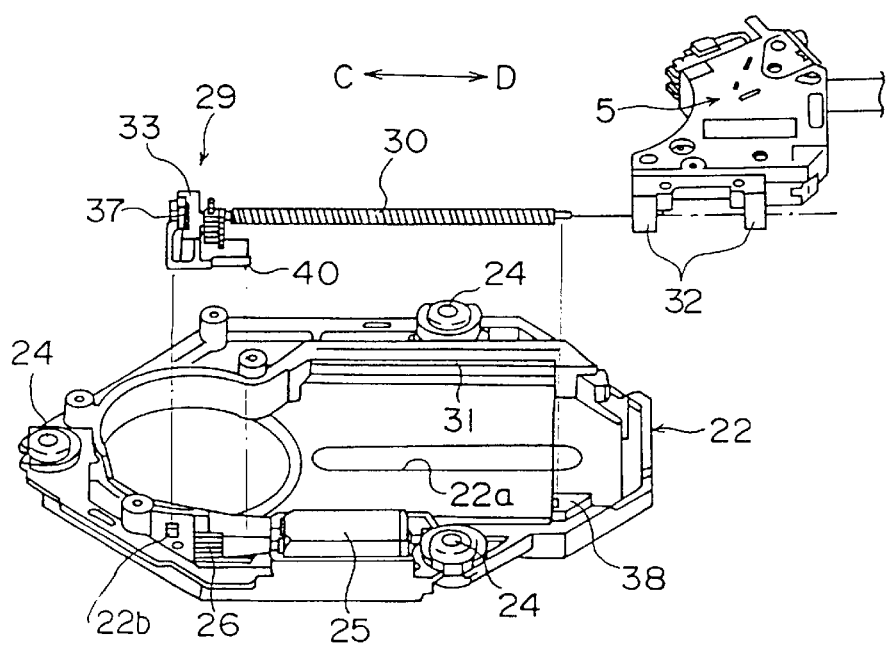
FIG. 17 is a perspective view of the pickup moving member and a pickup unit which are mounted on a base.
Figure 18A:
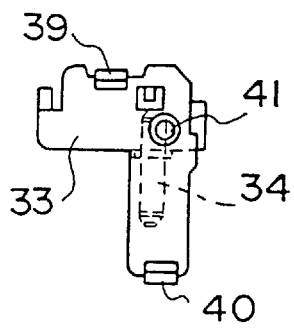
FIGS. 18A, 18B and 18C are views of a mounting holder of the CD-ROM disk device.
Figure 18B:
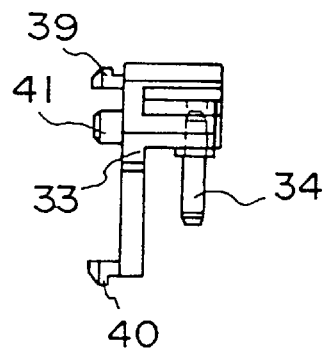
Figure 18C:
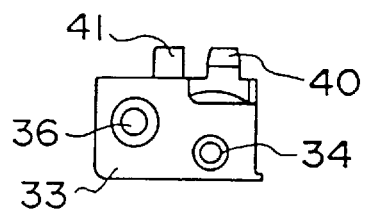

FIG. 16 shows the pickup drive mechanism 29 of the CD-RIM disk device 1 in FIG. 11. FIG. 17 shows the pickup drive mechanism 29 and the pickup unit 5 which are mounted on the base 22 of the drive unit 21. FIGS. 18A, 18B and 18C show a mounting holder 33 of the CD-ROM disk device 1 in FIG. 11.

Referring to FIGS. 16 through 18C, the pickup drive mechanism 29 in the present embodiment will be described.

As described above, the pickup drive mechanism 29 includes the gears 27 and 28. The mounting holder 33, shown in FIGS. 18A through 18C, is made by molding of a resin material. The gears 27 and 28 are rotatably supported on the mounting holder 33.

As shown in FIG. 16, a supporting pin 34 is press-fitted on the mounting holder 33, and the gear 27 is rotatably supported on the supporting pin 34. An E-ring 35 is fitted on the leading edge of the supporting pin 34 so as to prevent the separation of the gear 27 from the supporting pin 34.

Also, as shown in FIG. 16, the gear 28 is press-fitted on one end of the lead screw 30, and this end of the lead screw 30 is inserted into a hole 36 of the mounting holder 33 so that the gear 28 and the lead screw 30 are rotatably supported on the hole 36. A leaf spring 37 is fixed at its one end to a rear surface of the mounting holder 33. The other end of the leaf spring 37 on the rear surface of the mounting holder 33 serves to push the end of the lead screw 30, passed through the mounting holder 33, in the radial direction D by an actuating force of the leaf spring 37.

As shown in FIG. 17, the base 22 of the drive unit 21 includes a bearing portion 38. The other end of the lead screw 30 which is opposite to the mounting holder 33 is supported on the bearing portion 38. The end of the lead screw 30 is supported on the bearing portion 38 while the opposite end of the lead screw 30 is pushed in the direction D by the leaf spring 37. This construction of the pickup drive mechanism 29 provides a high level of accuracy of the movement of the pickup unit 5 relative to the CD-ROM on the tray 2.

The base 22 of the drive unit 21 includes three mounting holes 22b (only one mounting hole 22b is shown in FIG. 17). The mounting holder 33 includes two projections 39 and 40 and a rib 41. The projections 39 and 40 and the rib 41 of the mounting holder 33 are fitted to the mounting holes 22b of the base 22, so that the mounting holder 33 is secured to the base 22.

As described above, the base 22 of the drive unit 21 is made of the glass-fiber filled resin material to maintain the positions of the pickup unit 5 and the turn table 6 on the base 22 at a high level of accuracy. In the present embodiment, the mounting holder 33 of the pickup drive mechanism 29 is separate from the base 22. It is possible that the mounting holder 33 is made of a resin material other than the glass-fiber filled resin material. If the mounting holder 33 is made of the glass-fiber filled resin material, there is a problem in that the supporting pin 34 of the mounting holder 33 is likely to be broken when press fitting the gear 27 to the supporting pin 34. To avoid this problem, the mounting holder 33 of the present embodiment is made of a resin material which is flexible and includes no glass fiber.

Next, the turn table 6 and the disk motor 20 in the present embodiment will be described.

The turn table 6 is directly connected to a drive shaft of the disk motor 20. As shown in FIG. 11, the disk motor 20 is arranged under the turn table 6. The recording disk (or the CD-ROM) is held by the turn table 6 and rotated by the disk motor 20 when the tray 2 is at the inserted position within the CD-ROM disk device 1.

As shown in FIG. 12, the disk motor 20 is arranged on and fixed to a base plate 42. Further, as shown in FIG. 15, the base plate 42 is fixed to the base 22 of the drive unit 21 by fastening screws 43. Thus, both the disk motor 20 and the turn table 6 are arranged on the base 22 of the drive unit 21.

As described above, the drive unit 21 has the electrical parts arranged on the base 22, the electrical parts including at least the pickup unit 5, the disk motor 20, and the pickup moving motor 25. The drive unit 21 is accommodated in the moving unit including the tray 2. It is necessary that the electrical parts of the moving unit are electrically connected to a printed circuit board 44 arranged on the chassis 10 in order to operate the drive unit 21. The printed circuit board 44 includes a signal processing circuit used to process a reproducing signal output from the pickup unit 5, and a control circuit used to control the operations of the disk motor 10 and the pickup moving motor 25.

Since the moving unit including the tray 2 and the drive unit 21 is movable between the inserted position and the disk-change position in the insert direction B and the eject direction A, the electrical connections between the electrical parts of the moving unit and the printed circuit board 44 are accomplished by a flexible printed circuit (FPC) cable 45.

In the present embodiment, as shown in FIG. 13, a connector 46 is arranged on the printed circuit board 44 of the chassis 10, and the connector 46 is electrically coupled to the printed circuit board 44. As shown in FIGS. 14 and 15, a connector 47 is arranged on the base plate 42, and the connector 47 electrically coupled to the electrical parts of the moving unit (or the drive unit 21).

As shown in FIG. 13, the flexible printed circuit (FPC) cable 45 includes a first arm portion (on the side of the printed circuit board 44) having a connector portion fitted to the connector 46, and a second arm portion (on the side of the drive unit 21) having a connector portion fitted to the connector 47. By this construction, the connector 47 of the moving unit (or the drive unit 21) and the connector 46 of the printed circuit board 44 are interconnected by the FPC cable 45.

Since the FPC cable 45 in the present embodiment has a flat, single-layer structure attached to the chassis 10, it is possible to provide a small height for the CD-ROM disk device 1. Also, since the FPC cable 45 in the present embodiment has a simple structure and is less expensive, it is possible to provide a reduction of the manufacturing cost for the CD-ROM disk device 1.

For the CD-ROM disk device 1 of the above-described embodiment, it is necessary to provide a unit which electrically couples the connector 47 of the drive unit 21 to the electrical parts (the pickup unit 5, the disk motor 20 and the pickup moving motor 25) of the moving unit. The CD-ROM disk device 1 of the present embodiment includes a flexible cable 48 which is used to electrically couple the connector 47 to the electrical parts of the moving unit.

As shown in FIG. 14, the flexible cable 48 includes a base portion 48a, a first extending portion 48b, a second extending portion 48c, a third extending portion 48d, and a fourth extending portion 48e. The base portion 48a of the flexible cable 48 is secured to a front surface of the chassis 10 by fastening screws 50. The first extending portion 48b extends from the base portion 48a to the tray locking unit 8. The second extending portion 48c extends from the base portion 48a to the pickup moving motor 25. The third extending portion 48d extends to the pickup unit 5. The fourth extending portion 48e extends from the base portion 48a to the connector 47. By this construction, the electrical coupling between the connector 47 and the pickup unit 5 and the pickup moving motor 25 of the moving unit is accomplished by the flexible cable 48. The electrical coupling between the connector 47 and the disk motor 20 is accomplished by using a printed wiring (not shown) which is printed on the base plate 42.

In the above-described embodiment, the flexible cable 48 is used to electrically couple the connector 47 of the drive unit 21 to the electrical parts (the pickup unit 5, the disk motor 20 and the pickup moving motor 25) of the moving unit. Alternatively, lead wire lines or jumper lines may be used instead of the flexible cable 48.

FIG. 19 shows the tray sliding unit 4 and the tray pushing unit 7 of the CD-ROM disk device 1. FIGS. 20A, 20B and 20C show the functions of the tray pushing unit 7 of the CD-ROM disk device 1.

Referring to FIG. 19, the tray pushing unit 7 will be described. When the tray 2 is moved in the eject direction A to the disk-change position, the tray pushing unit 7 serves to prevent the tray 2 at the disk-change position from being further moved in the eject direction A.

The tray pushing unit 7 includes a lever 51 with two slots 52 and 53 formed therein, and a coil spring 56. Two connecting pins 54 and 55 are provided on the movable rail 17 on the side wall 10a of the chassis 10, and the connecting pins 54 and 55 laterally extend from the movable rail 17. The slots 52 and 53 of the lever 51 are connected to the connecting pins 54 and 55. The coil spring 56 pushes the lever 51 in the direction A by an actuating force of the coil spring 56. The lever 51 is arranged at a rear end portion of the movable rail 17 on the side wall 10c. The chassis 10 has a projection 57 vertically extending from the base portion 10a of the chassis 10. A projection 58 is provided at a rear end of the lever 51, and the projection 58 laterally extends from the lever 51. The lever 51 has a connecting pin 59 at a front end of the lever 51. One end of the coil spring 56 is attached to the connecting pin 59, and the other end of the coil spring 56 is attached to the connecting pin 54.

Since the slots 52 and 53 of the lever 51 are connected to the connecting pins 54 and 55 of the movable rail 17, the lever 51 is movable between a first position and a second position in the eject direction A and the insert direction B. When the tray 2 is moved in the eject direction A to the disk-change position, the projection 58 of the lever 51 is attached to the projection 57 of the chassis 10. Therefore, the tray pushing unit 7 serves to prevent the tray 2 at the disk-change position from being further moved in the eject direction A.

Referring to FIGS. 20A, 20B and 20C, the functions of the tray pushing unit 7 will be described.

FIG. 20A shows a condition of the tray pushing unit 7 when the tray 2 is pulled out to the disk-change position. As described above, when the tray 2 is at the disk-change position, the projection 57 of the lever 51 is attached to the projection 57 of the chassis 10. A further movement of the tray 2 from the disk-change position in the eject direction A is prevented by the tray pushing unit 7. The lever 51 in this condition is projecting from the rear end of the movable rail 17 by a distance L indicated by the arrow L in FIG. 20A.

FIG. 20B shows a condition of the tray pushing unit 7 when the tray 2 is inserted in the insert direction B into the chassis 10 until the rear end of the lever 51 touches the rear wall 10d of the chassis 10. When the tray 2 is further inserted in the insert direction B from the position shown in FIG. 20B, the lever 51 with its rear end touching the rear wall 10d of the chassis 10 pushes the tray 2 in the eject direction A by an actuating force of the coil spring 56.

FIG. 20C shows a condition of the tray pushing unit 7 when the tray 2 is moved in the insert direction B to the inserted position. The moving unit including the tray 2 at the inserted position is locked by the tray locking unit 8. However, the lever 51 continues to push the tray 2 in the eject direction A by the actuating force of the coil spring 56.

When the eject switch 12 on the front bezel 11 of the CD-ROM disk device 1 is slid by the operator, the moving unit including the tray 2 is unlocked from the tray locking unit 8. By the unlocking operation, the tray 2 is moved in the eject direction A by the actuating force of the coil spring 56, and the tray pushing unit 15 is returned to the condition shown in FIG. 20B. The operator on the CD-ROM disk device 1 can further pull out the tray 2 in the eject direction to the disk-change position by clamping the front bezel 11.

Figure 23:
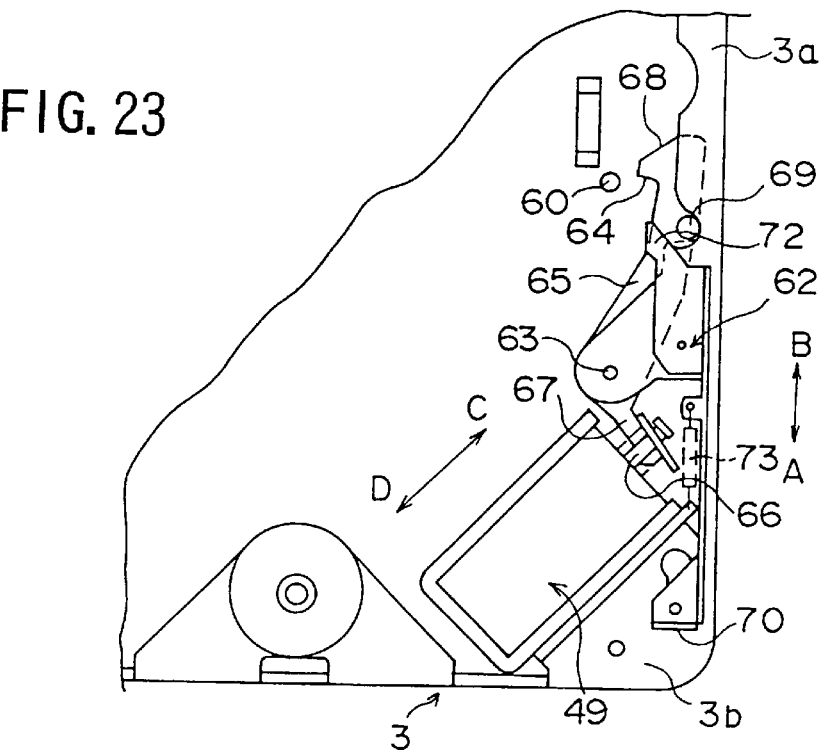
FIG. 23 is a diagram for explaining the functions of the tray locking unit.

FIG. 21 shows the sub-chassis 3 and the tray locking unit 8 of the CD-ROM disk device 1. FIG. 22 shows a condition of the tray locking unit 8 when the tray 2 is locked at the inserted position. FIG. 23 shows a condition of the tray locking unit 8 when the tray 2 is unlocked from the tray locking unit 8.

Referring to FIGS. 21 through 23, the tray locking unit 8 is arranged on the mounting surface 3b of the sub-chassis 3. The tray locking unit 8 generally has a solenoid 49, a lock pin 60, a lock lever 61, and an emergency lever 62.

The lock pin 60 vertically extends from the chassis 10. The lock lever 61 is rotatably supported on a shaft 63 which downwardly extends from the frame 3a of the sub-chassis 3. The lock lever 61 includes an arm portion 65 and a connecting arm 67. The arm portion 65 has a hook 64 at the leading edge of the arm portion 65, and the hook 64 is engaged with or disengaged from the lock pin 60 of the chassis 10. The solenoid 49 includes a plunger 66. The connecting arm 67 of the lock lever 61 is connected to the plunger 66 of the solenoid 49. The hook 64 of the arm portion 65 has a tapered surface 68. The arm portion 65 has an upwardly extending pin 69, and the pin 69 is engaged with or disengaged from the emergency lever 62. As shown in FIG. 21, a coil spring 70a is arranged in the solenoid 49 such that the plunger 66 is pushed in the direction C by an actuating force of the coil spring 70a.

The solenoid 49 moves the plunger 66 in the direction D by an electromagnetic force when the eject switch 12 on the front bezel 11 is slid by the operator. Since the plunger 66 is connected with the connecting arm 67 of the lock lever 61, the lock lever 61 is rotated around the shaft 63 by the movement of the plunger 66.

When the tray 2 is moved in the insert direction B to the inserted position, the sub-chassis 3 is also moved in the insert direction B relative to the chassis 10, and the lock lever 61 at this time approaches the lock pin 60. As the tray 2 reaches the inserted position, the tapered surface 68 of the hook 64 passes the lock pin 60 of the chassis 10 and the hook 64 of the lock lever 61 is engaged with the lock pin 60. Since the sub-chassis 3 when the tray 2 is at the inserted position is locked by the tray locking unit 8 as shown in FIG. 22, the moving unit including the tray 2 arranged on the sub-chassis 3 is locked at the inserted position.

When the eject switch 12 on the front bezel 11 is slid by the operator, the plunger 66 of the solenoid 49 is moved in the direction D by the electromagnetic force. The lock lever 61 is rotated clockwise around the shaft 63 by the movement of the plunger 66, so that the hook 64 of the lock lever 61 is disengaged from the lock pin 60 of the chassis 10. Since the sub-chassis 3 at this time is unlocked from the tray locking unit 8 as shown in FIG. 23, the moving unit including the tray 2 becomes again movable between the inserted position and the disk-change position.

As shown in FIG. 21, the emergency lever 62 is arranged on the frame 3a of the sub-chassis 3 such that the emergency lever 62 is movable in both the direction A and the direction B. The emergency lever 62 has a connecting surface 70 at the front end of the emergency lever 62, and the connecting surface 70 is placed at the rear surface of the front bezel 11.

The front bezel 11 has an insertion hole 71 (shown in FIG. 25) at a corresponding position of the connecting surface 70. The emergency lever 62 has a laterally extending tapered hook 72 at the rear end of the emergency lever 62, and the tapered hook 72 is engaged with or disengaged from the pin 69 of the lock lever 61. The emergency lever 62 has a coil spring 73. One end of the coil spring 73 is fixed to the emergency lever 62, and the other end thereof is fixed to the sub-chassis 3. Thus, the emergency lever 62 is pushed in the direction A by an actuating force of the coil spring 73.

The above-described emergency lever 62 is provided to manually unlock the tray 2 from the tray locking unit 8, even when the solenoid 49 does not work or a power-down of the personal computer occurs. The tray 2 which is locked at the inserted position can be unlocked from the tray locking unit 8 by using the emergency lever 62. Therefore, the operator can pull out the tray 2 in the eject direction A from the inserted position within the CD-ROM disk device 1 at any emergency occasion.

Figure 24:
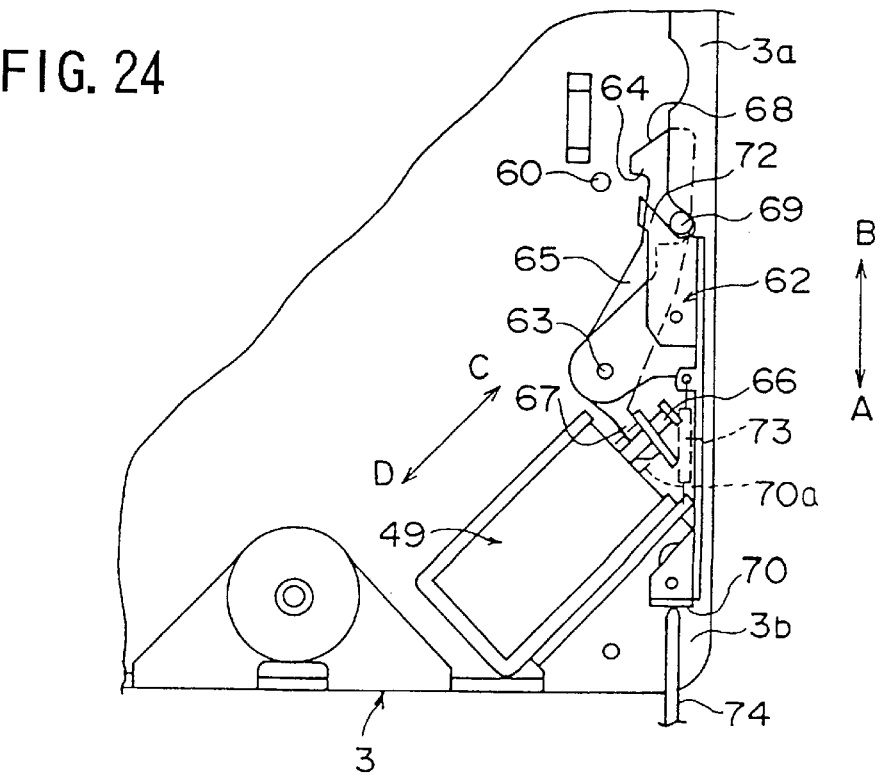
FIG. 24 is a diagram for explaining the functions of an emergency lever.

FIG. 24 shows the emergency lever 62 of the tray locking unit 8. As shown in FIG. 24, when an emergency occasion occurs, the operator inserts a needle 74 into the front bezel 11 from the insertion hole 71. The needle 74 is brought into contact with the connecting surface 70 of the emergency lever 62, and pushes the emergency lever 62 in the direction B. The tapered hook 72 of the emergency lever 62 is engaged with the pin 69 of the lock lever 61, and pushes the lock lever 61 in the direction B. The lock lever 61 at this time is rotated clockwise around the shaft 63 by the movement of the emergency lever 62, and the hook 64 of the lock lever 61 is disengaged from the lock pin 60 of the chassis 10. Thus, the moving unit including the tray 2 is manually unlocked from the tray locking unit 8 by using the emergency lever 62. Since the moving unit including the tray 2 is ejected from the chassis 10 by the tray pushing unit 7, the operator can pull out the tray 2 from the CD-ROM disk device 1 at the emergency occasion.

In the present embodiment, as shown in FIG. 22, the directions C and D in which the plunger 66 of the solenoid 49 is moved are at 45° angles to the directions B and A in which the tray 2 is moved on the CD-ROM disk device 1. When the notebook-size personal computer in which the CD-ROM disk device 1 is installed is carried, any impact may be given to the CD-ROM disk device 1. Since the solenoid 49 is arranged such that the directions C and D of the movement of the plunger 66 are at 45° angles to the directions B and A of the movement of the tray 2, it is possible to prevent the tray 2 from being unlocked from the tray locking unit 8 due to the impact. Thus, the construction of the present embodiment makes it possible to prevent the tray 2 from being abruptly ejected from the chassis 10. Also, it is possible to effectively prevent the CD-ROM disk device 1 from being damaged due to the impact.

Figure 25:
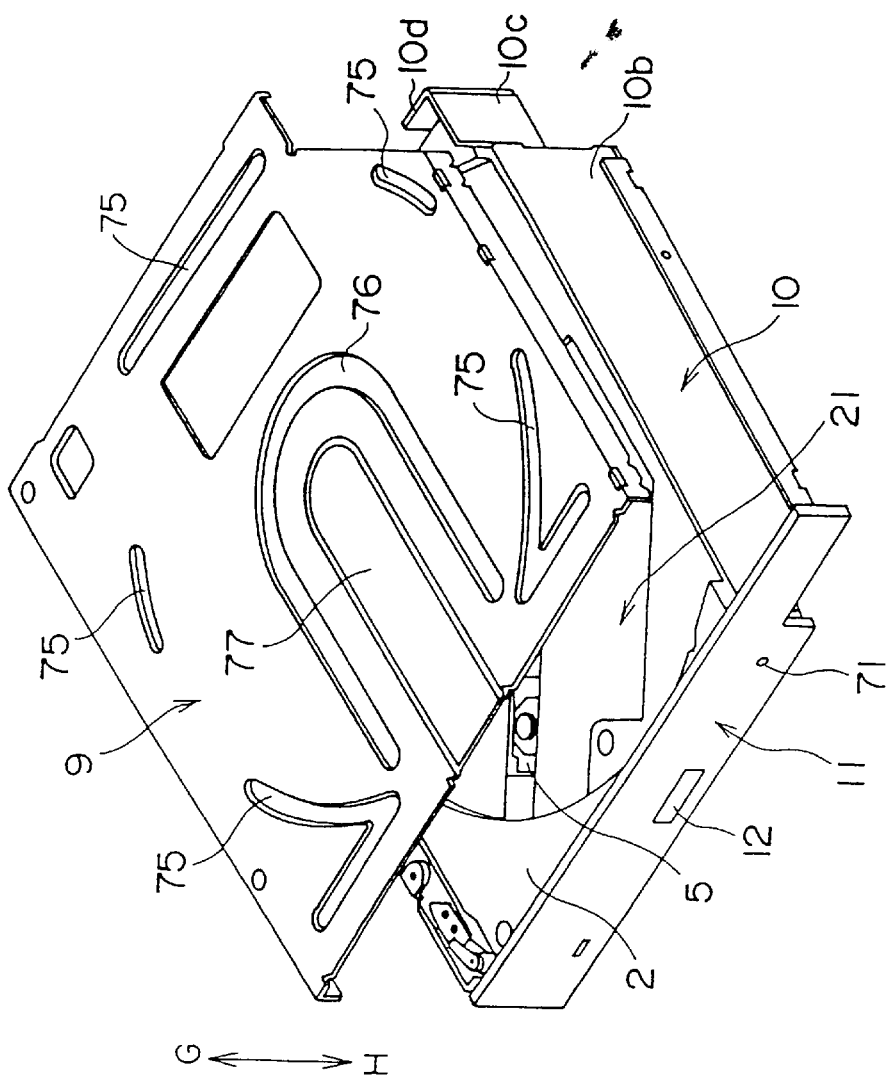
FIG. 25 is a perspective view of a cover plate of the CD-ROM disk device.

FIG. 25 shows the cover plate 9 of the CD-ROM disk device 1. FIGS. 26A and 26B show the function of the cover plate 9 of the CD-ROM disk device 1.

As shown in FIGS. 25 through 26B, the cover plate 9 has a number of downwardly projecting portions 75, a U-shaped downwardly projecting portion 76, and a central upwardly projecting portion 77. The cover plate 9 is made by press forming of a thin steel sheet. The cover plate 9 is provided in the CD-ROM disk device 1 to protect the units and parts arranged on the chassis 10 and the CD-ROM inserted therein. In order to maintain a suitable level of strength of the cover plate 9, the cover plate 6 is configured with these projecting portions 75, 76 and 77 by the press forming. In the present embodiment, the amount of the downward projection of the portions 75 is preset to about 0.6 mm, the amount of the downward projection of the portion 76 is preset to about 0.4 mm, and the amount of the upward projection of the portion 77 is preset to about 0.15 mm.

As shown in FIG. 26A, the amount of the downward projection of the portions 75 is the maximum among those of the projecting portions 75, 76 and 77. The projecting portions 75, 76 and 77 of the cover plate 9 are configured such that the portions 75 are the nearest to a recording disk 78 at its periphery, the recording disk 78 held by the turn table 6 on the tray 2.

As shown in FIG. 26B, when an impact is given in the direction H to the cover plate 9 of the CD-ROM disk device 1, the recording disk 78 is likely to be elastically deformed. Even when the recording disk 78 is elastically deformed, the inside surface of the central projecting portion 77 of the cover plate 9 touches the top of the turn table 6, and only the projecting portions 75 of the cover plate 9 touch the periphery of the recording disk 78. In the present embodiment, a width of the contact area between the cover plate 9 and the recording disk 78 in a radial direction of the recording disk 78 is preset to about 1 mm.

In a case in which the recording disk 78 is a CD-ROM, the CD-ROM has a data recorded layer on its bottom surface and a non-recorded peripheral area on its top surface. A width of the non-recorded peripheral area of the CD-ROM in a radial direction of the CD-ROM is at least 2 mm. Therefore, the construction of the cover plate 9 in the present embodiment makes it possible to effectively prevent the recorded data of the recording disk 78 from being damaged when an impact is given to the CD-ROM disk device 1.

In addition, the disk device of the present invention can be applied to not only the CD-ROM disk devices of the above-described embodiments but also compact disk devices, magnetic disk devices, magneto-optical disk devices and other optical disk devices.

Further, the CD-ROM disk devices of the above-described embodiments are a built-in type that is built in a casing of a notebook-size personal computer. However, the present invention is not limited to the above-described embodiments, and it is also applicable to other disk devices for a desktop computer or any other electronic device.

What is claimed is:

1. A disk device comprising: a fixed unit having a base portion, a cover portion and a lowered hollow portion and having a connector portion; a movable unit being accommodated in said base portion and to hold a recording disk, a bottom of a projecting portion of said recording disk on said moving unit being protected by said cover portion, said movable unit having a sub-chassis and electrical parts on the sub-chassis, said electrical parts including a disk motor arranged on a base plate, said movable unit being supported on the fixed unit such that the movable unit is movable between an inserted position and a disk-change position in both an inserting direction and an ejecting direction; and a flexible printed circuit cable having wires for electrically connecting the fixed unit and the electrical parts of the movable unit, said flexible printed circuit cable having a connector portion, said connector portion of said flexible printed circuit cable being fitted to the connector portion of the fixed unit and arranged on the base plate having the disk motor thereon such that the electrical parts of the movable unit are electrically connected to the fixed unit through the base plate, substantially all of said flexible printed circuit cable having a width substantially parallel to said base plate and perpendicular to said wires within said flexible printed circuit cable.

2. The disk device according to claim 1 further comprising a printed circuit board arranged on said fixed unit, and said connector portion of said fixed unit being electrically coupled to said printed circuit board.

3. The disk device according to claim 1, wherein said fixed unit has a chassis which includes said base portion, said cover portion and said lowered hollow portion, said chassis having right and left sides, and said hollow portion is provided under said cover portion at one of the right and left sides of said chassis.

4. The disk device according to claim 1, wherein said disk motor rotates said recording disk on said movable unit.

5. The disk device according to claim 1, wherein said electrical parts also include a pickup unit, and a pickup moving unit, said recording disk on said movable unit being rotated by said disk motor, and said pickup unit being moved in a radial direction of said recording disk by said pickup moving unit.

6. The disk device according to claim 1, wherein said electrical parts are operated to reproduce information from the recording disk held on said movable unit.

7. The disk device according to claim 1, wherein said fixed unit has a chassis and said flexible printed circuit cable has an arm portion attached to said chassis.

8. The disk device according to claim 1, wherein said flexible printed circuit cable has an arm portion which is folded back to extend in the ejecting direction.

9. The disk device according to claim 1, wherein said flexible printed circuit cable includes a reinforcing plate attached to said connector portion, thereof said reinforcing plate having a restricting portion which restricts said connector portion of said flexible printed circuit cable.

10. The disk device according to claim 1, wherein said fixed unit includes a printed circuit board provided therein.

11. A disk device comprising:

a fixed unit having a base plate and side walls;

a movable unit to hold a recording disk on a surface of said movable unit, said movable unit having a sub-chassis and electrical parts on the sub-chassis, said movable unit being movably supported on the side walls of the fixed unit such that the movable unit is movable between an inserted position and a disk-change position in both an inserting direction and an ejecting direction; and a flexible printed circuit cable for electrically connecting the fixed unit and the electrical parts of the movable unit, said flexible printed circuit cable including a first arm portion and a second arm portion and arranged within a space between the base plate of the fixed unit and the movable unit, said first arm portion having an end at which a first connector portion is arranged, said first connector portion being attached to the fixed unit, said second arm portion being folded back to extend in the ejecting direction, said second arm portion having an end at which a second connector portion is arranged, said second connector portion being connected to the movable unit, wherein substantially all of the first arm portion and substantially all of the second arm portion each has a width which is substantially parallel to both the base plate of the fixed unit and said surface of said movable unit on which the recording disk is held.

12. The disk device according to claim 11, wherein said fixed unit includes a printed circuit board provided therein.

13. The disk device according to claim 11, wherein said fixed unit has a chassis which includes said base plate and side walls and a lowered hollow portion, said movable unit being accommodated in said chassis, a bottom of a projecting portion of the recording disk on said movable unit being protected by said chassis, and said hollow portion being provided at one of the right and left sides of said chassis.

14. The disk device according to claim 11, wherein said electrical parts include at least a disk motor which rotates said recording disk on said movable unit.

15. The disk device according to claim 14, wherein said second connector is fixed to said disk motor.

16. The disk device according to claim 11, wherein said electrical parts include a pickup unit, a disk motor and a pickup moving unit, said recording disk on said movable unit being rotated by said disk motor, and said pickup unit being moved in a radial direction of said recording disk by said pickup moving unit.

17. The disk device according to claim 11, wherein said electrical parts are operated to reproduce information from the recording disk held on said movable unit.

18. The disk device according to claim 11, wherein said flexible printed circuit cable includes a reinforcing plate attached to said second connector portion, said reinforcing plate having a restricting portion which restricts said second connector portion of said flexible printed circuit cable.

19. The disk device according to claim 11, wherein the fixed unit includes a first connector and the movable unit includes a second connector, the first connector portion of the flexible printed circuit cable being connected to said first connector, the second connector portion of the flexible printed circuit cable being connected to said second connector.

20. The disk device according to claim 19, wherein the electrical parts include at least a disk motor which is provided on the base plate, fixed to the sub-chassis of the movable unit, the disk motor rotating the recording disk on the movable unit, the second connector of the movable unit being provided on the base plate.

* * * * *